United States Patent
Yanagi et al.

(10) Patent No.: US 11,640,576 B2
(45) Date of Patent: May 2, 2023

(54) SHELF MONITORING DEVICE, SHELF MONITORING METHOD, AND SHELF MONITORING PROGRAM

(71) Applicant: PANASONIC INTELLECTUAL PROPERTY MANAGEMENT CO., LTD., Osaka (JP)

(72) Inventors: Kazuhiro Yanagi, Fukuoka (JP); Takeshi Wakako, Fukuoka (JP); Tetsurou Kakizawa, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 266 days.

(21) Appl. No.: 16/759,852

(22) PCT Filed: Aug. 14, 2018

(86) PCT No.: PCT/JP2018/030293
§ 371 (c)(1),
(2) Date: Apr. 28, 2020

(87) PCT Pub. No.: WO2019/087519
PCT Pub. Date: May 9, 2019

(65) Prior Publication Data
US 2020/0334620 A1    Oct. 22, 2020

(30) Foreign Application Priority Data

Oct. 30, 2017   (JP) .............................. JP2017-209440

(51) Int. Cl.
*G06Q 10/087*    (2023.01)
*G06T 7/73*      (2017.01)
*G06Q 30/0601*   (2023.01)

(52) U.S. Cl.
CPC ....... *G06Q 10/087* (2013.01); *G06Q 30/0639* (2013.01); *G06T 7/73* (2017.01)

(58) Field of Classification Search
CPC .................................................. G06Q 10/087
See application file for complete search history.

(56) References Cited

U.S. PATENT DOCUMENTS

2005/0138584 A1*   6/2005   Beattie .................. G06F 30/367
                                                           716/111
2008/0077511 A1    3/2008   Zimmerman
(Continued)

FOREIGN PATENT DOCUMENTS

| JP | 2015-103153 | 6/2015 |
| JP | 6112436 | 4/2017 |
| WO | 2017/117686 | 7/2017 |

OTHER PUBLICATIONS

International Search Report issued in International Pat. Appl. No. PCT/JP2018/030293, dated Nov. 13, 2018.
(Continued)

*Primary Examiner* — Florian M Zeender
*Assistant Examiner* — Vanessa Deligi
(74) *Attorney, Agent, or Firm* — Greenblum & Bernstein, P.L.C.

(57) ABSTRACT

A shelf monitoring device may be provided with a detector, a setter, a monitoring section, and an output section. The detector detects shelf labels attached to a display shelve to correspond to articles to be displayed on the display shelves, with video recognition of video data that includes the display shelves. Based on the position of the detected shelf label, the setter sets a monitoring area in which articles to be displayed on the display shelves in video data. The monitoring section monitors the shelving condition of the articles on the display shelves based on a change in video in response to the presence or absence of the article in the (Continued)

monitoring area. The output unit outputs the monitoring results according to the monitoring unit.

12 Claims, 23 Drawing Sheets

(56) References Cited

U.S. PATENT DOCUMENTS

| | | |
|---|---|---|
| 2009/0094140 A1 | 4/2009 | Kwan |
| 2014/0006229 A1* | 1/2014 | Birch ................ G06Q 10/087 705/28 |
| 2015/0262116 A1* | 9/2015 | Katircioglu ............ G06V 20/52 705/28 |
| 2016/0224857 A1* | 8/2016 | Zhang ................ G06V 10/457 |
| 2016/0260055 A1* | 9/2016 | High .................... G06V 20/653 |
| 2016/0300181 A1 | 10/2016 | Iwai et al. |
| 2016/0342863 A1* | 11/2016 | Kwon ................. G06F 16/5854 |
| 2017/0103515 A1* | 4/2017 | Hulth ..................... G06Q 10/08 |
| 2017/0124424 A1 | 5/2017 | Takahashi et al. |
| 2017/0286901 A1 | 10/2017 | Skaff et al. |
| 2017/0293959 A1 | 10/2017 | Itou et al. |
| 2017/0295953 A1 | 10/2017 | Sakata et al. |
| 2018/0089613 A1* | 3/2018 | Chen ......................... G06T 7/90 |
| 2018/0181906 A1* | 6/2018 | Baduge ................ G06Q 10/087 |
| 2018/0247264 A1* | 8/2018 | Taylor .............. G06Q 10/06316 |
| 2019/0034864 A1* | 1/2019 | Skaff ..................... H04N 23/695 |
| 2020/0005225 A1* | 1/2020 | Chaubard ............. G06T 11/203 |
| 2020/0215698 A1* | 7/2020 | Bogolea ............... G06V 10/225 |
| 2020/0234227 A1* | 7/2020 | Gadou ................. G06F 16/583 |

OTHER PUBLICATIONS

Extended European Search Report dated Jul. 1, 2020 for European Patent Application No. 18874773.7-1222.
Official Action dated Apr. 5, 2022 issued in European patent application No. 18874773.7-1222.

* cited by examiner

| ID | STORE NUMBER | FLOOR | AISLE | SHELF | ROW | POSITION | PRODUCT NAME | ... |
|----|--------------|-------|-------|-------|-----|----------|--------------|-----|
| 0  | 2            | 3     | 3     | 2     | 7   | 1        | XXX PASTA    | ... |
| 1  | 2            | 3     | 3     | 2     | 7   | 2        | YYY CURRY    | ... |
| ...| ...          | ...   | ...   | ...   | ... | ...      | ...          | ... |

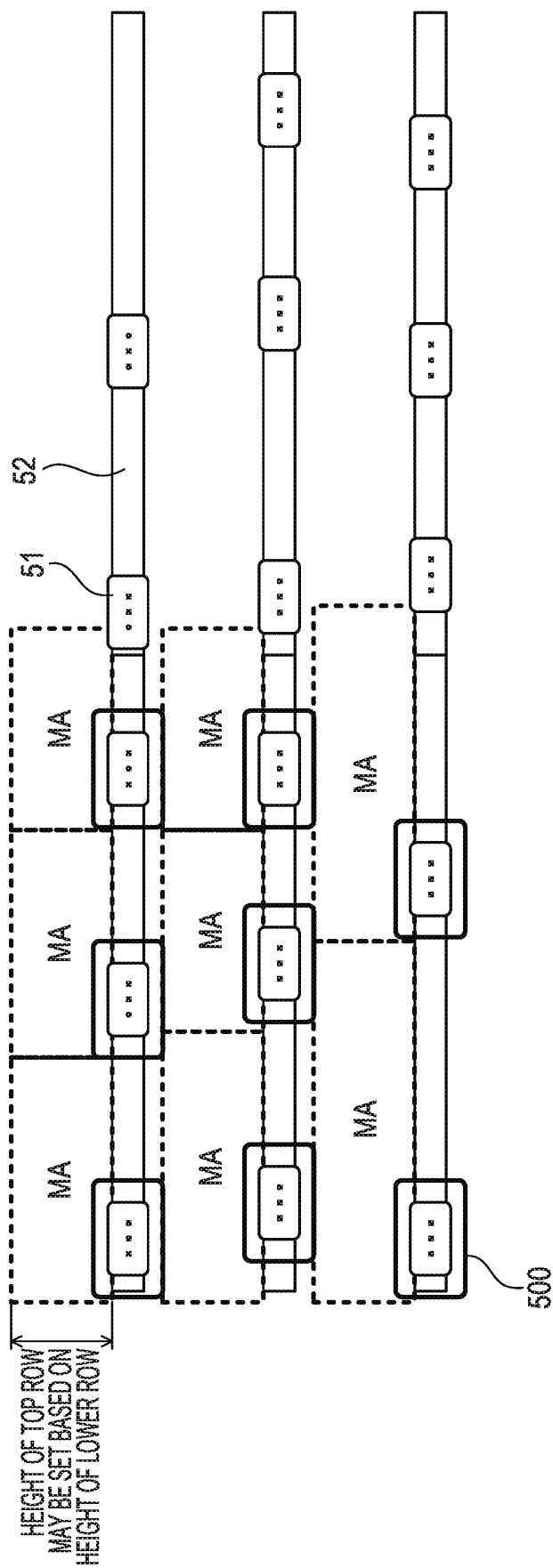

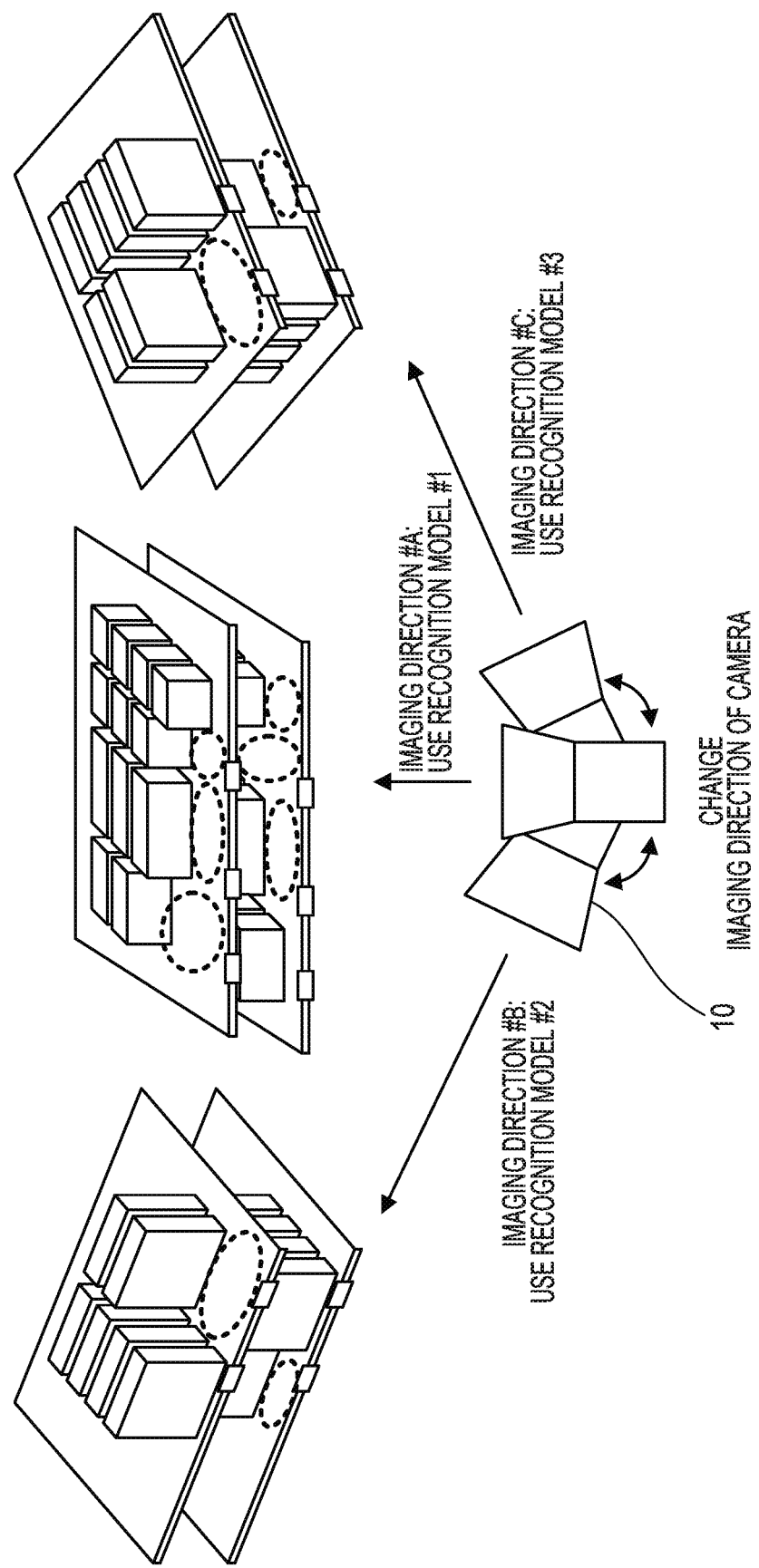

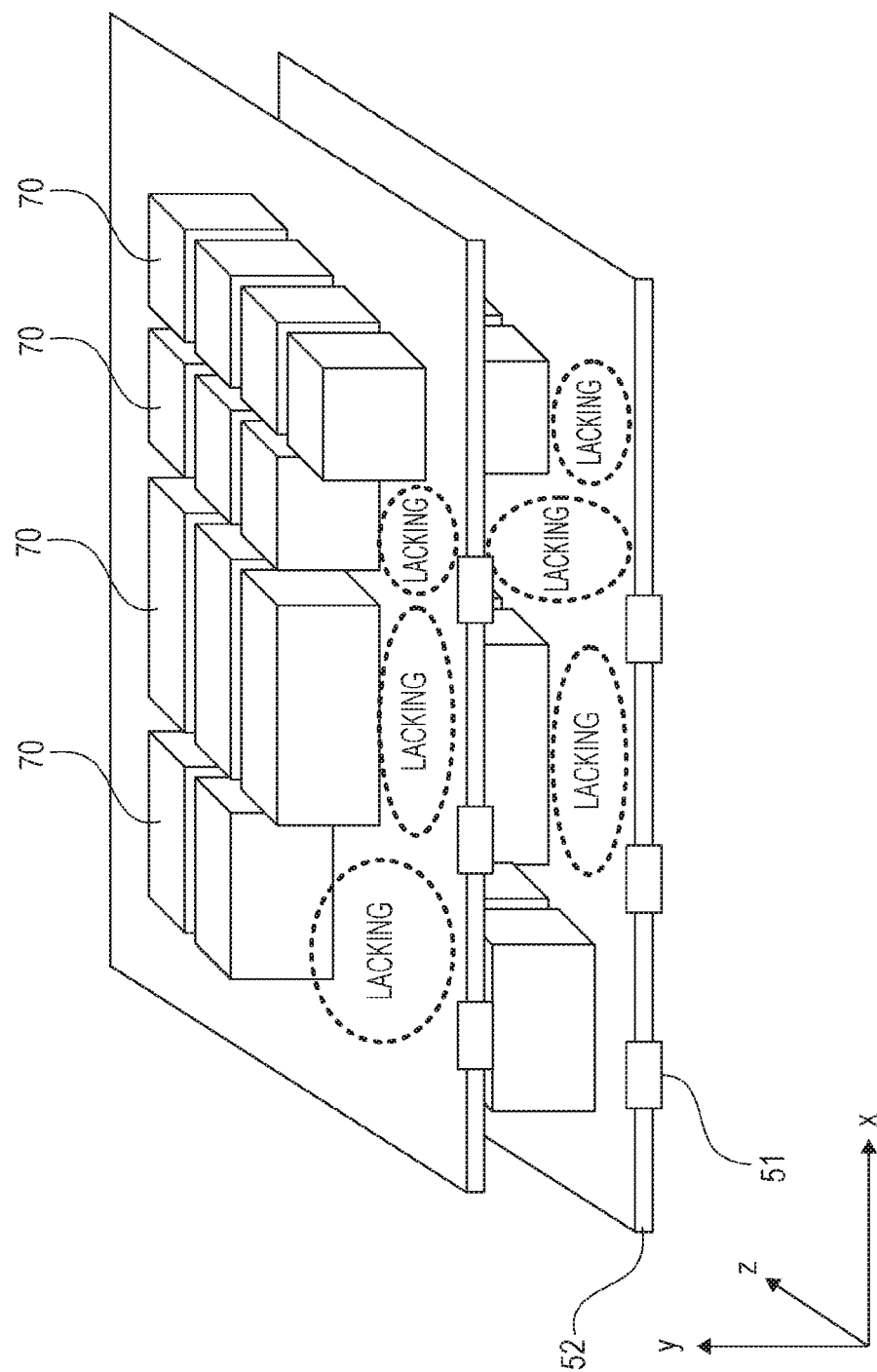

PERSON (MOBILE OBJECT)

REMOVE MOBILE OBJECT

SHELF MONITORING DEVICE, SHELF MONITORING METHOD, AND SHELF MONITORING PROGRAM

BACKGROUND

Technical Field

The present disclosure relates to a shelf monitoring device, a shelf monitoring method, and a shelf monitoring program.

Description of the Related Art

In the retail industry, business has become more efficient by, for example, systematizing the management of a stock and/or sales of products. For the stock management, for example, a system that monitors a stock of products based on video of a product display area (e.g., a display shelf) obtained by a monitoring camera may be used.

LITERATURE LIST

Patent Literature

PTL 1
Japanese Patent Application Laid-Open No. 2015-103153
PTL 2
Japanese Patent No. 6112436

SUMMARY

However, for example, when a shelf row (i.e., an area or region to be monitored) to be included in a monitoring target is not appropriately set for video including a display shelf, it may be difficult to accurately monitor the stock quantity of products (e.g., shortage or lacking of products) in some cases.

Thus, after all, a person may be required to visually inspect a stock of individual products. With visual inspection, in some cases, there may be a discrepancy between the number of individual products (physical stock quantity) actually displayed in a display area and, for example, the number of stock quantity of individual products (theoretical stock quantity) managed by a stock management system.

When there is a discrepancy between the physical stock quantity and the theoretical stock quantity, for example, a person may be required to manually correct stock management data, such as the theoretical stock quantity in accordance with the physical stock quantity confirmed by visual inspection, and the correction takes time.

Since it is burdensome for a stock manager to make such correction every day and/or every hour, for example, a specific product may remain lacking. When the product remains lacking, a product selling opportunity is lost, and as a result, customers may have a negative image in some cases.

One non-limiting and exemplary embodiment facilitates providing a shelf monitoring device, a shelf monitoring method, and a shelf monitoring program available to set a monitoring area in video including a display shelf appropriately to monitor a display condition of goods or articles on the display shelf accurately.

Solution

In one general aspect, the techniques disclosed here related to a shelf monitoring device includes: a detector that detects a shelf label attached to a display shelf to correspond to an article displayed in the display shelf, through video recognition of video data including the display shelf; a setter that sets, based on a position of the detected shelf label, a monitoring area in which the article is to be displayed in the display shelf in the video data; a monitoring section that monitors, based on a change in video in response to presence or absence of the article in the monitoring area, a display condition of the article in the display shelf; and an output section that outputs a monitoring result obtained by the monitoring section.

In one general aspect, the techniques disclosed here related to a shelf monitoring method includes: detecting a shelf label attached to a display shelf to correspond to an article displayed in the display shelf through video recognition of video data including the display shelf; setting, based on a position of the detected shelf label, a monitoring area in which the article is to be displayed in the display shelf in the video data; monitoring, based on a change in video in response to presence or absence of the article in the monitoring area, a display condition of the article in the display shelf; and outputting a result of the monitoring.

In one general aspect, the techniques disclosed here related to a shelf monitoring program according to one aspect of the present disclosure causes a computer to execute a process including: detecting a shelf label attached to a display shelf to correspond to an article displayed in the display shelf through video recognition of video data including the display shelf; setting, based on a position of the detected shelf label, a monitoring area in which the article is to be displayed in the display shelf in the video data; monitoring, based on a change in video in response to presence or absence of the article in the monitoring area, a display condition of the article in the display shelf; and outputting a result of the monitoring.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Advantageous Effects

In one general aspect, it is possible to appropriately setting a monitoring area in video including a display shelf, and thus, it is possible to accurately monitor an article display condition.

Further advantages and benefits in an aspect of the present disclosure will become apparent from the specification and the drawings. Although the advantages and/or benefits are provided by some embodiments and features illustrated in the specification and the drawings, not all of the advantages and the benefits need to be provided to obtain one or more such features.

BRIEF DESCRIPTION OF DRAWINGS

FIG. 4 illustrates an example of shelf allocation information according to the embodiment;

FIG. 14 illustrates an example in which a monitoring area is set by the stock monitoring device illustrated in FIGS. 1 and 5;

FIG. 21 illustrates an example in which recognition models used for pattern matching of video recognition differ for each imaging direction in FIG. 20;

FIG. 23 illustrates an example in which stock levels are detected in the depth direction of shelf rows in the stock monitoring device illustrated in FIGS. 1 and 5;

DETAILED DESCRIPTION

Now, embodiments will be described below in detail with reference to the drawings as appropriate. Note that detailed description more than necessary may be omitted. For example, detailed description of a well-known matter and repeated description of substantially the same configuration may be omitted. This will prevent unnecessarily redundant description below and will help easy understanding of a person skilled in the art.

Note that the attached drawings and the following description are provided for a person skilled in the art to fully understand the present disclosure and are not intended to limit the subject described in Claims.

System Configuration Example

Figure 1:
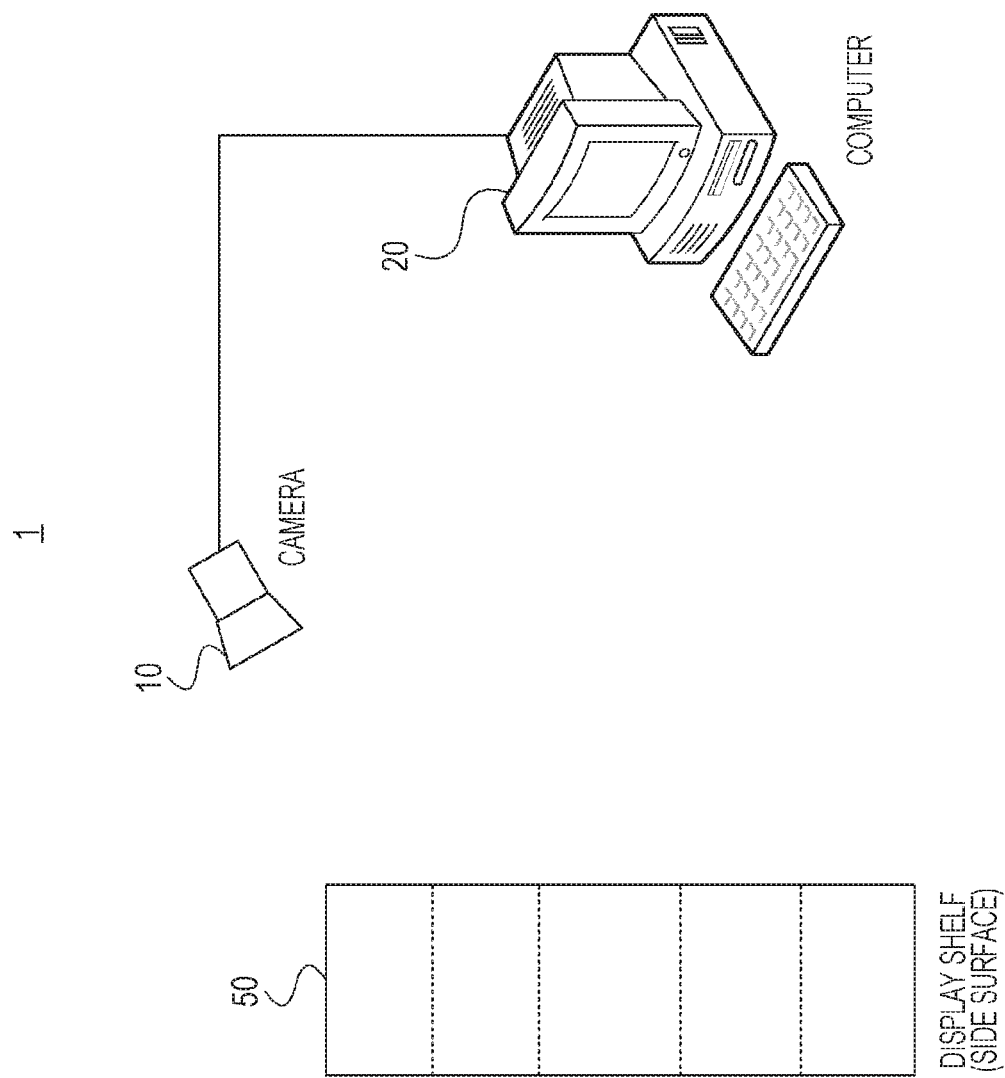
FIG. 1 is a block diagram illustrating a configuration example of a stock management system according to an embodiment.

FIG. 1 is a block diagram illustrating a configuration example of a stock management system according to an embodiment. Stock management system 1 illustrated in FIG. 1 may include, for example, camera 10 and computer 20. Note that the "stock management system" may be, in other words, a "stock monitoring system".

Camera 10 is, for example, arranged in a store selling products and captures video including an area where products are displayed, for example, an area where display shelf 50 for products is arranged. The type of business or business condition of the store where display shelf 50 is arranged and types of products handled by the store are not limited.

For example, display shelf 50 may be provided in a supermarket, a convenience store, a department store, a mass merchandiser, a discount store, or a shop or a selling booth (or a selling corner) arranged in any facility. In addition, display shelf 50 may also be provided outside not only inside.

Camera 10 may be a dedicated camera that images an area including display shelf 50 or may be a camera that is also used for another purpose or usage, such as a surveillance camera. Also, multiple cameras 10 may be provided in stock management system 1.

An imaging target (i.e., "monitoring target") by camera 10 and display shelf 50 may correspond to each other in a one-to-one relationship, a one-to-many relationship, or a many-to-one relationship. For example, single display shelf 50 may be an imaging target of single camera 10, or multiple display shelves 50 may be an imaging target of single camera 10.

For example, by using camera 10 whose imaging direction and/or angle of view can be changed, such as a PTZ camera, multiple different display shelves 50 may be included in an imaging target of single PTZ camera 10. Alternatively, different regions or spaces of single display shelf 50 may be included in an imaging target of single PTZ camera 10.

For example, when it is difficult to include the width or height of single display shelf 50 in camera video of single camera 10, by controlling the imaging direction of one or more PTZ cameras 10 to be variable, a plurality of regions or spaces with different widths or heights may be captured in a camera image.

In the above manner, by using a PTZ camera as camera 10, it is unnecessary to arrange camera 10 for each display shelf 50 or each different region or space of display shelf 50. Thus, it is possible to reduce the number of cameras 10 arranged in stock management system 1.

Computer 20 illustrated in FIG. 1 is an example of an information processing device and may be a personal computer (PC) or a server. The server may include a cloud server. Computer 20 and camera 10 are, for example, connected to each other with a wire or wirelessly and communicate with each other. In addition, computer 20 and camera 10 may be connected to each other via a network.

The term "network" may be a wired network or a wireless network. Examples of the wired network include an intranet, the Internet, and a wired local area network (LAN). Examples of the wireless network include wireless LAN.

Computer 20, for example, receives video data obtained by camera 10 (hereinafter also abbreviated to "camera video") and analyzes the received camera video. For example, through video recognition of camera video of display shelf 50, computer 20 monitors a stock of products in display shelf 50 and detects shortage or lacking of a product.

"Video recognition" may also be referred to as "image recognition". In addition, detecting the shortage or lacking of a product may collectively be referred to as "detecting of lacking" for convenience. "Detecting" may also be referred to as "sensing". In addition, a device from which camera video is transmitted may be camera 10 or, for example, a recording device that records video data obtained by camera 10.

Monitoring a stock of products may include detecting of the position of a shelf label attached to display shelf 50. The shelf label may indicate, for example, information on a product (hereinafter referred to as "product information"), such as a product name and/or price. The shelf label may be a paper shelf label or an electronic shelf label. The electronic shelf label may be constituted with a liquid crystal display or the like or may be formed as electronic paper or the like. In addition, the electronic shelf label may have a wireless communication function or the like, and presented information may be rewritable by remote control. The "shelf label" may also be referred to as another name, such as a shelf tag, a shelf card, or a bin tag.

For example, through video recognition of camera video, computer 20 detects the position of a shelf label attached to display shelf 50, and, based on the detected position of the shelf label, may set a region or space for monitoring a stock in display shelf 50.

Hereinafter, the region or space for monitoring a stock of products may collectively be referred to as "monitoring area" or "monitoring region". An example of setting the monitoring area in display shelf 50 based on the position of shelf label 51 detected through video recognition will be described later.

Figure 2:
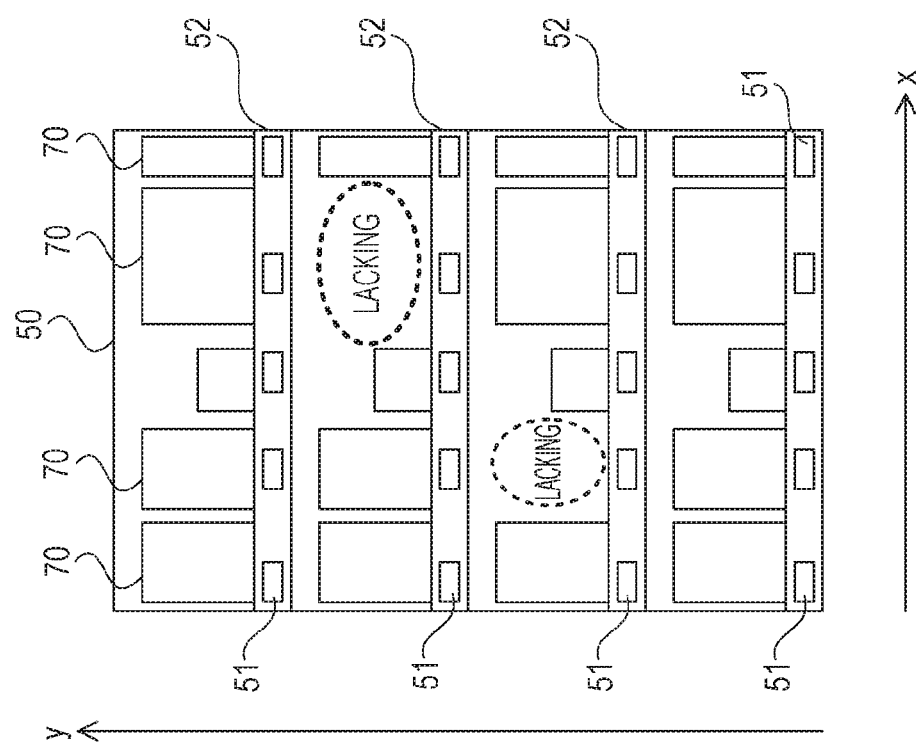
FIG. 2 is a schematic front view of a display shelf to which shelf labels are attached according to the embodiment.
Figure 3:
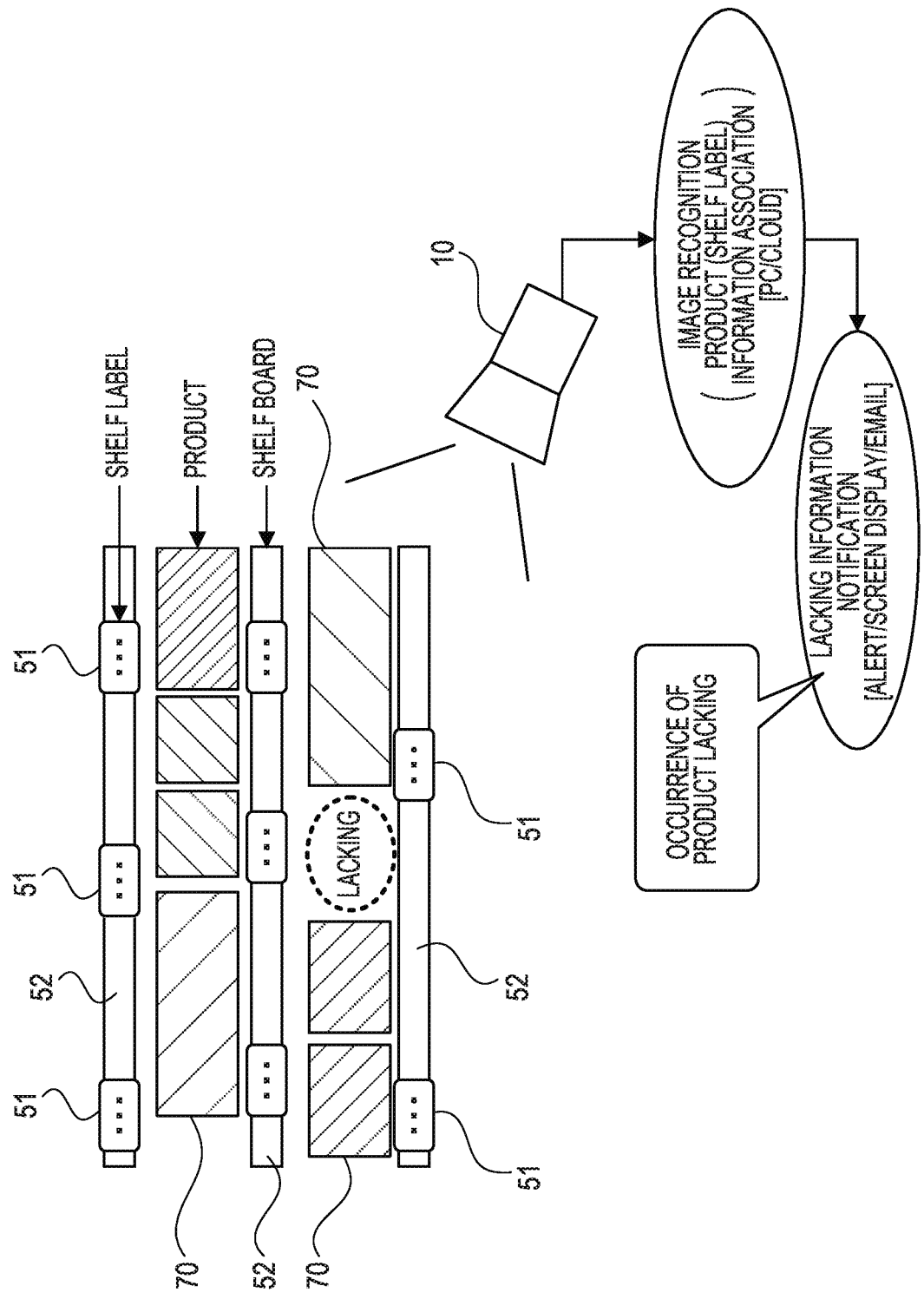
FIG. 3 is an enlarged view of part of the front view of the display shelf illustrated in FIG. 2.

FIG. 2 is a schematic front view of display shelf 50 to which shelf labels 51 are attached. FIG. 3 is an enlarged view of part of the front view of display shelf 50 illustrated in FIG. 2. As a non-limiting example, FIGS. 2 and 3 illustrate a form in which a display space of display shelf 50 is divided into four spaces in the height direction of display shelf 50 by three shelf boards 52. In FIGS. 2 and 3, a region surrounded by a dotted frame represents a condition in which product 70 is lacking.

In addition, FIG. 3 also illustrates an example in which, computer 20 performs video recognition on the video data including display shelf 50 obtained by camera 10 and detects the shortage or lacking of a product in the monitoring area set based on the position of detected shelf label 51. The detected information is output by computer 20.

The display space divided in the height direction of display shelf 50 may also be referred to as "shelf row". FIG. 2 illustrates an example focusing on two shelf rows. The manner of dividing the display space in display shelf 50 is not limited. In addition to the height direction of display shelf 50, the display space may also be divided in the width direction of display shelf 50.

Shelf label 51 may be attached to any position of the display shelf 50 at which a correspondence relationship with product 70 to be displayed is visually recognizable. For example, shelf label 51 may be attached to shelf board 52. In each display space, product 70 is, for example, displayed in a region or space corresponding to the position of corresponding shelf label 51 (space above shelf label 51 in the example in FIGS. 2 and 3).

For setting the monitoring area and/or for monitoring a stock, in addition to position information of detected shelf label 51, information on shelf allocation (hereinafter referred to as "shelf allocation information") may be used. "Shelf allocation" indicates, for example, a plan about products and numbers thereof to be displayed in (or allocated to) each display space of display shelf 50.

FIG. 4 illustrates an example of shelf allocation information 400. As illustrated in FIG. 4, shelf allocation information 400 may include, for example, information indicating the position at which product 70 is to be displayed and information on product 70 to be displayed at the position. The information indicating the position at which product 70 is to be displayed may be referred to as "display position information", and the information on product 70 may be referred to as "product information" in the following description.

As a non-limiting example, the display position information may include information indicating any one or more of a store number, a floor number, an aisle number, a shelf number, a shelf row number, and a display position in a shelf row.

The product information may include, for example, information by which individual product 70 can be determined or identified, such as the type or content of product 70. Non-limiting examples of the information by which product 70 can be determined or identified include a product name, such as "XXX pasta" or "YYY curry", and a product code.

The product information may include, for example, information indicating the size (at least one of the width, height, and depth) of product 70, and information indicating the number of products 70 to be displayed, in other words, information indicating a display number. In addition, the product information may further include information indicating the price of product 70.

For example, "display number" may indicate the number of products 70 to be displayed in one or more of the width direction, the height direction, and the depth direction of a shelf row. Based on either the information indicating the size of product 70 or the information indicating the display number of product 70, or both, for example, it is possible to determine a space or region occupied by multiple products 70 in a shelf row with higher accuracy.

Accordingly, with referring to shelf allocation information 400, computer 20 is possible to increase the accuracy for setting the monitoring area based on the shelf label position, and as a result, the accuracy for detecting lacking of product 70 can be increased.

In addition, based on shelf allocation information 400, computer 20 may correct the detecting result (e.g., the shelf label position) of shelf label 51 attached to display shelf 50 based on video recognition. Correction of the shelf label position may include, for example, correction of failure in detecting shelf label 51 through video recognition based on shelf allocation information 400.

Examples of setting the monitoring area and examples of correcting the shelf label position by using shelf allocation information 400 will be described later.

In a case where shelf allocation information 400 is not used, specific information on the short or lacking of product 70 in the monitoring area may be unavailable. However, from a result of image recognition of the monitoring area set based on the shelf label position (e.g., a ratio of a background image appearing in the monitoring area), it is possible to detect the position and the shelf row in which product 70 is short or lacking. By additionally using shelf allocation information 400 in such a detecting process, it is possible to determine specific information on what product 70 is in lacking. For example, it is possible to provide information such as "XXX pasta is lacking" or "XXX pasta in a x-th row and a y-th column is lacking".

Configuration Example of Computer 20

Figure 5:
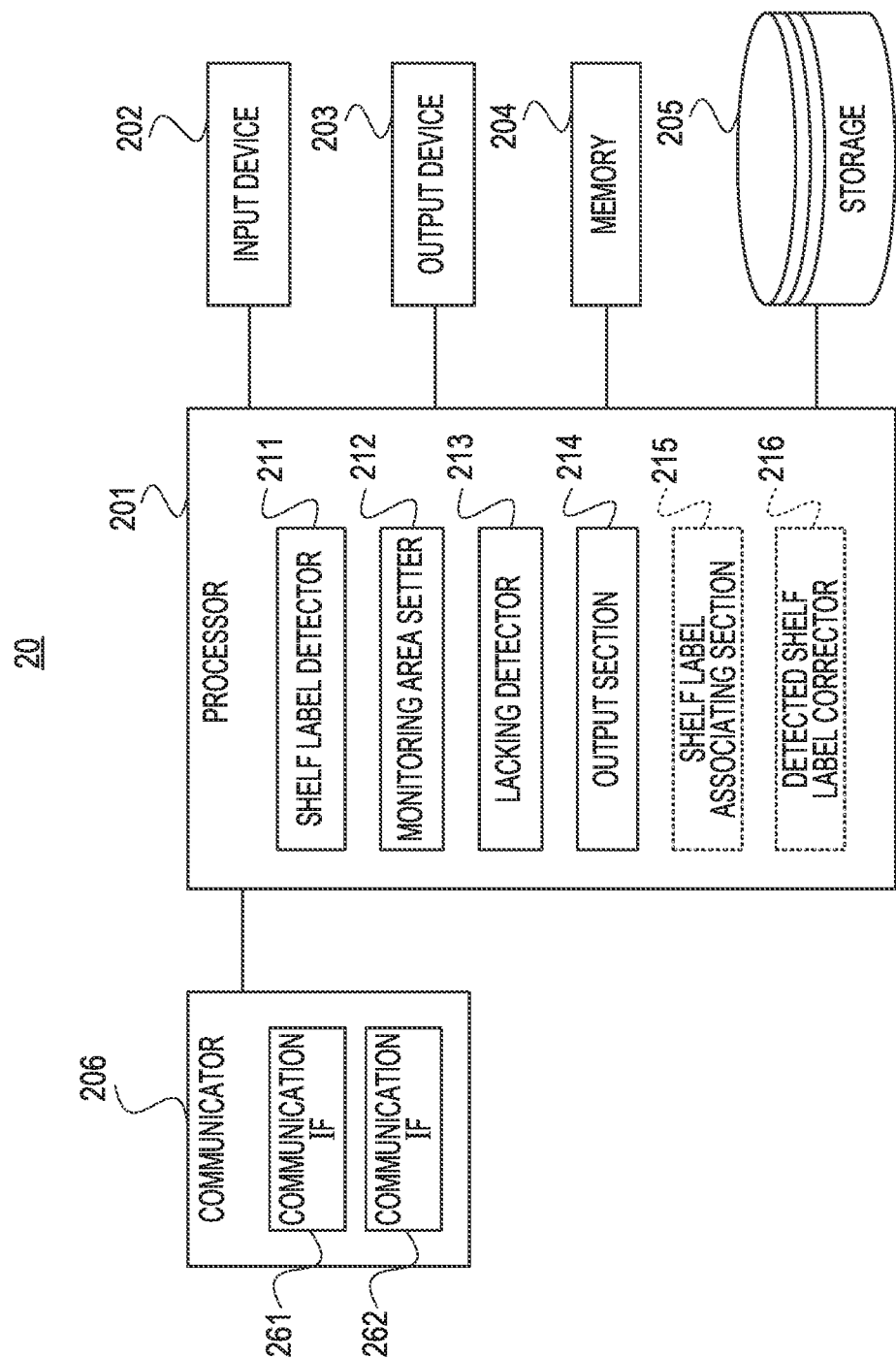
FIG. 5 is a block diagram illustrating a configuration example of a computer illustrated in FIG. 1.

Next, a configuration example of computer 20 will be described with reference to FIG. 5. As illustrated in FIG. 5, for example, computer 20 may include processor 201, input device 202, output device 203, memory 204, storage 205, and communicator 206.

Processor 201 controls the operation of computer 20. Processor 201 is an example of a circuit or device having an arithmetic capability. As processor 201, for example, at least one of a central processing unit (CPU), a micro processing unit (MPU), and a graphics processing unit (GPU) may be used.

Input device 202 may include, for example, at least one of a keyboard, a mouse, an operation button, and a microphone. Through input device 202, data or information may be input to processor 201.

Output device 203 may include, for example, at least one of a display (or a monitor), a printer, and a speaker. For example, the display may be a touch-panel display. The touch-panel display may correspond to both input device 202 and output device 203.

Memory 204 stores, for example, a program executed by processor 201 and data or information processed in accordance with the execution of the program. Memory 204 may include a random access memory (RAM) and a read only memory (ROM). The RAM may be used as a work memory of processor 201. The term "program" may also be referred to as "software" or "application".

Storage 205 stores a program executed by processor 201 and data or information processed in accordance with the execution of the program. Storage 205 may store shelf allocation information 400 described above. Shelf allocation information 400 may be stored in storage 205 in advance or may be, for example, provided from a shelf allocation system (not illustrated) that manages shelf allocation information 400 and stored in storage 205.

Storage 205 may include a semiconductor drive device such as a hard disk drive (HDD) or a solid state drive (SSD). In addition to or in place of a semiconductor drive device, a non-volatile memory, such as a flash memory, may be included in storage 205.

The program may include a stock monitoring program that monitors a stock of product 70 through video recognition, as described above. All or part of a program code composing the stock monitoring program may be stored in memory 204 and/or storage 205 or may be incorporated in part of an operating system (OS).

The program and/or data may be provided in the form of being recorded on a recording medium that can be read by computer 20. Examples of the recording medium include a flexible disk, a CD-ROM, a CD-R, a CD-RW, an MO, a DVD, a Blu-ray disc, a portable hard disk, and the like. In addition, a semiconductor memory such as a universal serial bus (USB) memory is also an example of the recording medium.

In addition, the program and/or data may be, for example, provided (downloaded) to computer 20 from a server (not illustrated) via a communication line. For example, the program and/or data may be provided to computer 20 through communicator 206 and stored in memory 204 and/or storage 205. In addition, the program and/or data may be provided to computer 20 through input device 202 and may be stored in memory 204 and/or storage 205.

Communicator 206 includes, for example, communication interface (IF) 261 for communication with camera 10. Communication IF 261 may be any of a wired interface and a wireless interface.

For example, communication IF 261 receives video data obtained by camera 10. The received video data is, for example, stored in memory 204 and/or storage 205 through processor 201. When camera 10 is a PTZ camera, for example, communicator 206 may communicate with PTZ camera 10 in accordance with an instruction from processor 201 to control the imaging direction and/or angle of view of PTZ camera 10.

In addition, communicator 206 may further include communication IF 262 for communication with "another computer" (not illustrated) different from computer 20. The "other computer" may be, for example, a server connected to a wired or wireless network or a user terminal connected to a wired or wireless network. The "other computer" may correspond to a computer in the above-described shelf allocation system.

The user terminal may be owned by, for example, a stock manager of product 70. Non-limiting examples of the user terminal include a PC, a mobile phone (including a smartphone), and a tablet terminal. The user terminal may be provided with information related to stock management or stock monitoring of products.

Processor 201 may, for example, read and execute the stock monitoring program stored in memory 204 and/or storage 205 to cause computer 20 to function as a stock monitoring device that monitors a stock of product 70 through video recognition.

For example, processor 201 executes the stock monitoring program, and thereby, stock monitoring device 20 illustrated in FIG. 5 is embodied. Stock monitoring device 20 includes shelf label detector 211, monitoring area setter 212, lacking detector 213, and output section 214. Optionally, in stock monitoring device 20, either shelf label associating section 215 or detected shelf label corrector 216, or both, may be embodied in accordance with the execution of the stock monitoring program.

Shelf label detector 211, for example, detects shelf label 51 included in camera video through video recognition of camera video including the entire or part of display shelf 50. For example, by using a template image corresponding to the shape and/or color of shelf label 51, shelf label detector 211 may perform pattern matching of the camera video to detect shelf label 51.

Monitoring area setter 212, for example, sets the monitoring area in display shelf 50 based on the position of shelf label 51 detected by shelf label detector 211.

Lacking detector 213 is an example of a monitoring section and, for example, monitors a stock (or may be referred to as "display condition") of product 70 in display shelf 50 based on a change in video corresponding to the presence or absence of a product in the monitoring area set by monitoring area setter 212.

For example, by using, as the template image, background image that appears in the monitoring area when product 70 is short or lacking, lacking detector 213 may perform pattern matching of the camera video of the monitoring area to detect shortage or lacking of product 70.

The shape of shelf label 51 may differ in the camera video depending on the position where camera 10 is arranged and/or the imaging direction thereof. For example, the shape of shelf label 51 differs between camera video capturing display shelf 50 from the front and camera video capturing display shelf 50 obliquely from the front.

Further, the background image that appears in the camera video when product 70 is short or lacking may differ depending on the position where camera 10 is arranged and/or the imaging direction thereof (hereinafter also collectively referred to as "camera position" for convenience).

For example, in camera video capturing display shelf 50 from the front, an image of a backboard seen from the front, the back board being located in the back surface of display shelf 50, may correspond to the background image. In addition, in camera video capturing display shelf 50 obliquely from above, for example, a surface of shelf board 52 on which product 70 is displayed may correspond to the background image. In camera video capturing display shelf 50 obliquely from a side, for example, a surface of a partition (not illustrated) that partitions the shelf row in the horizontal direction may correspond to the background image.

In the above manner, the shape of shelf label 51 and/or the background image differs depending on the camera position. Thus, a template image (i.e., "recognition model") used for pattern matching of video recognition corresponding to the camera position may be prepared. In this embodiment, the recognition model is a template image, and the shape of shelf label and/or the background image is recognized by pattern matching. However, other implementation methods are possible. For example, a trained model generated by machine learning of each of the shelf label and/or the background image may be used as the recognition model to recognize the shelf label and/or the background image.

For example, when camera 10 is arranged at a plurality of positions, and/or when the imaging direction is variable such as in PTZ camera 10, a plurality of template images may be prepared. The template images are, for example, stored in storage 205 and read by processor 201 at an appropriate time.

Output section 214 is, an example of a notification information generator that generates and outputs information to be presented (e.g., sent as a notification) to, for example, the stock manager. Output section 214, for example, generates notification information including a detection result of lacking detector 213 and/or information based on the detection result and outputs the notification information to output device 203 and/or communicator 206.

As a non-limiting example, information as a notification of detecting of lacking of product 70 (also referred to as "notification information", "lack information", or "alert information") may be output to a display and/or a printer, which is an example of output device 203.

Output section 214 may generate the notification information based on information in which either one or both of a detection result of lacking detector 213 and a detection result of shelf label detector 211 is/are associated with shelf allocation information 400.

For example, based on information in which the detection result of lacking detector 213 is associated with shelf allocation information 400, output section 214 can generate the notification information including the position related to detecting of lacking of product 70 (lack area) and/or a product name of product 70 for which lacking is detected.

The notification information may be sent to, for example, the "other computer" through communicator 206. Email may be used to send the notification information through communicator 206.

Shelf label associating section 215, for example, associates each shelf label 51 detected by shelf label detector 211 with shelf allocation information 400 (e.g., product information).

When shelf allocation information 400 includes, as an example of the product information, information on the size and the display number of product 70, for example, based on the product information, detected shelf label corrector 216 may correct the shelf label position detected by shelf label detector 211.

The configuration of computer (stock monitoring device) 20 illustrated in FIG. 5 is an example. Hardware components and/or functional blocks in stock monitoring device 20 may be increased or decreased as appropriate. For example, hardware components and/or functional blocks may be added, deleted, divided, or integrated in stock monitoring device 20 as appropriate.

Operation Example

Next, an operation example of stock monitoring device 20 will be described.

Figure 6:
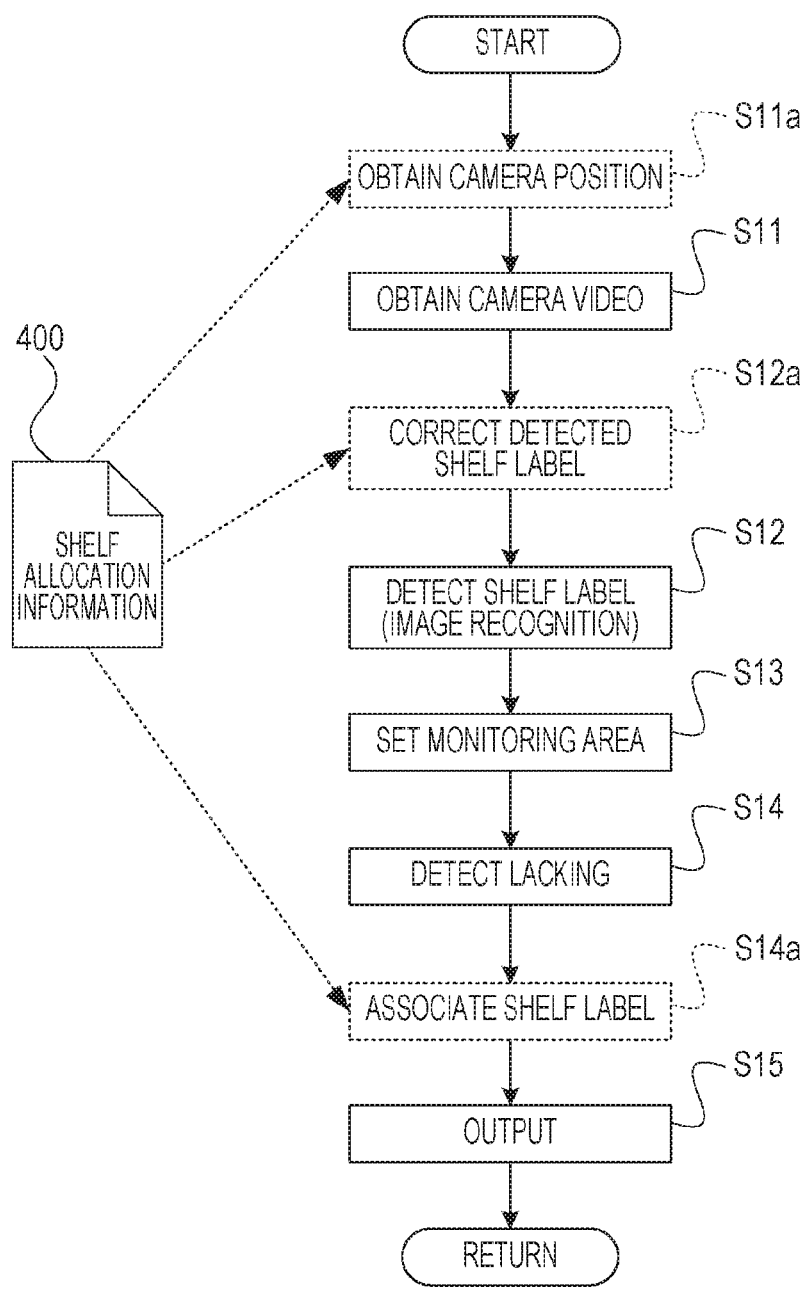
FIG. 6 is a flowchart illustrating an operation example of the computer (stock monitoring device) illustrated in FIGS. 1 and 5.

As illustrated in FIG. 6, stock monitoring device 20, for example, obtains camera video (S11) and analyzes the obtained camera video in shelf label detector 211, for example, thereby detecting shelf label 51 included in the camera video (S12). For example, as illustrated in FIG. 7 with thick frame 500, eight shelf labels 51 are detected through video recognition.

Figure 7:
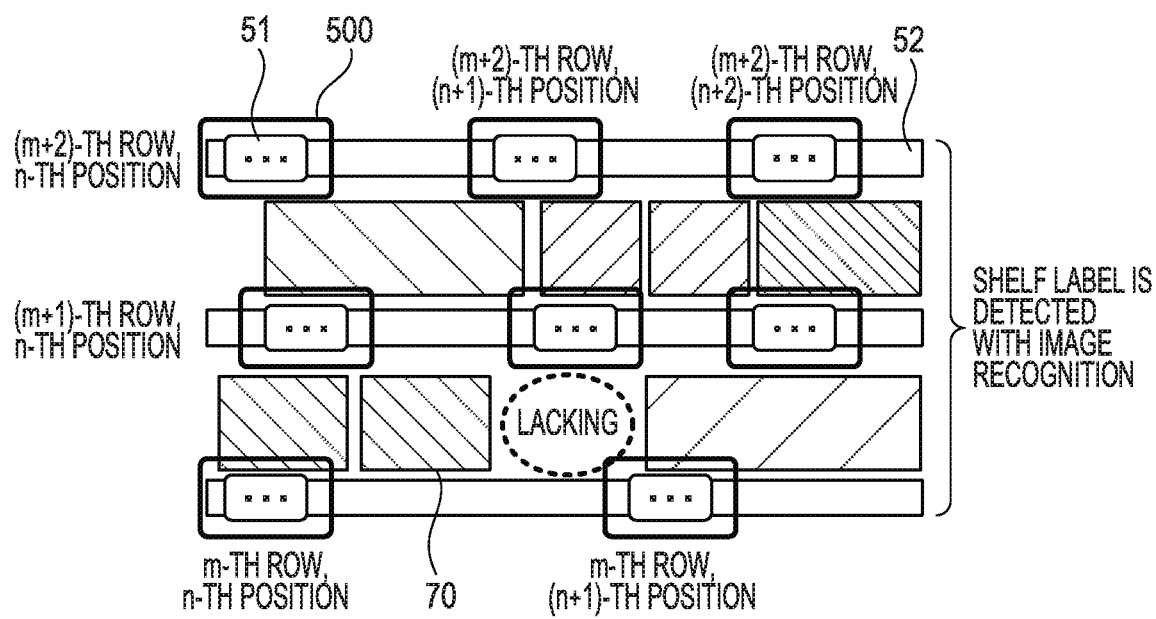
FIG. 7 illustrates an example in which shelf labels are detected through video recognition in the stock monitoring device illustrated in FIGS. 1 and 5.

In the example in FIG. 7, two shelf labels 51 are detected on shelf board 52 in a m-th row from the bottom, and on each of shelf boards 52 (in (m+1)-th and (m+2)-th rows from the bottom) located thereabove, three shelf labels 51 are detected. The m is an integer greater than or equal to 1.

Positions of two shelf labels 51 detected on shelf board 52 in the m-th row from the bottom are, for example, n-th and (n+1)-th positions (n is an integer greater than or equal to 1) from the left. Similarly, positions of three shelf labels 51 detected on shelf board 52 in the (m+1)-th row from the bottom are, for example, n-th, (n+1)-th, and (n+2)-th positions from the left. Positions of three shelf labels 51 detected on shelf board 52 in the (m+2)-th row from the bottom are, for example, n-th, (n+1)-th, and (n+2)-th positions from the left. The "m-th row and n-th" position may be denoted as a "m-th row, n-th position" or "m-th row, n-th column" position.

When multiple cameras 10 are included in stock management system 1 or when a PTZ camera is used as camera 10, stock monitoring device 20 may, for example, obtain information indicating the camera position and may provide the information to shelf label detector 211 (S11a in FIG. 6).

The information indicating the camera position may be, for example, associated with shelf allocation information 400 in advance. For example, based on the information indicating the camera position and shelf allocation information 400, shelf label detector 211 may identify camera 10 and its imaging direction of the camera video and may set a recognition model appropriate for detection of shelf label 51 through video recognition. Examples of association between the information indicating the camera position and shelf allocation information 400 will be described later.

In response to detection of shelf label 51 (S12 in FIG. 6), stock monitoring device 20 sets, by using monitoring area setter 212, for example, a monitoring area for monitoring a stock of product 70 (S13 in FIG. 6). For example, monitoring area setter 212 sets one of detected shelf labels 51 as reference shelf label 51. As a non-limiting example, FIG. 7 illustrates a form in which lower left (first row, first position) shelf label 51 is set as reference shelf label 51.

Reference shelf label 51 may be autonomously set by stock monitoring device 20 (e.g., monitoring area setter 212) or may be designated (manually designated) by a user (e.g., a stock manager) of stock monitoring device 20.

For example, reference shelf label 51 can be autonomously set through video recognition by differentiating the external appearance of reference shelf label 51 from the others, such as color (e.g., frame color) and/or shape, from the external appearance of the other shelf labels 51.

Alternatively, information of "x-th row, y-th position" shelf label 51 may be input to monitoring area setter 212 through input device 202 as information specifying reference shelf label 51. In addition, manual specification may be used for compensating for autonomous setting.

In response to setting of reference shelf label 51, monitoring area setter 212 may, for example, detect shelf label 51 adjacent to reference shelf label 51 in the vertical direction and/or horizontal direction based on shelf allocation information 400 (e.g., the display position information) illustrated in FIG. 4.

Shelf label 51 that is adjacent in the vertical direction and/or horizontal direction may be referred to as "adjacent shelf label 51" for convenience. "Detection" of adjacent shelf label 51 may also be referred to as "search" or "retrieval" for adjacent shelf label 51.

Based on the distance between detected shelf labels 51, monitoring area setter 212 may set the monitoring area. An example for setting the monitoring area is illustrated in FIG. 8.

Figure 8:
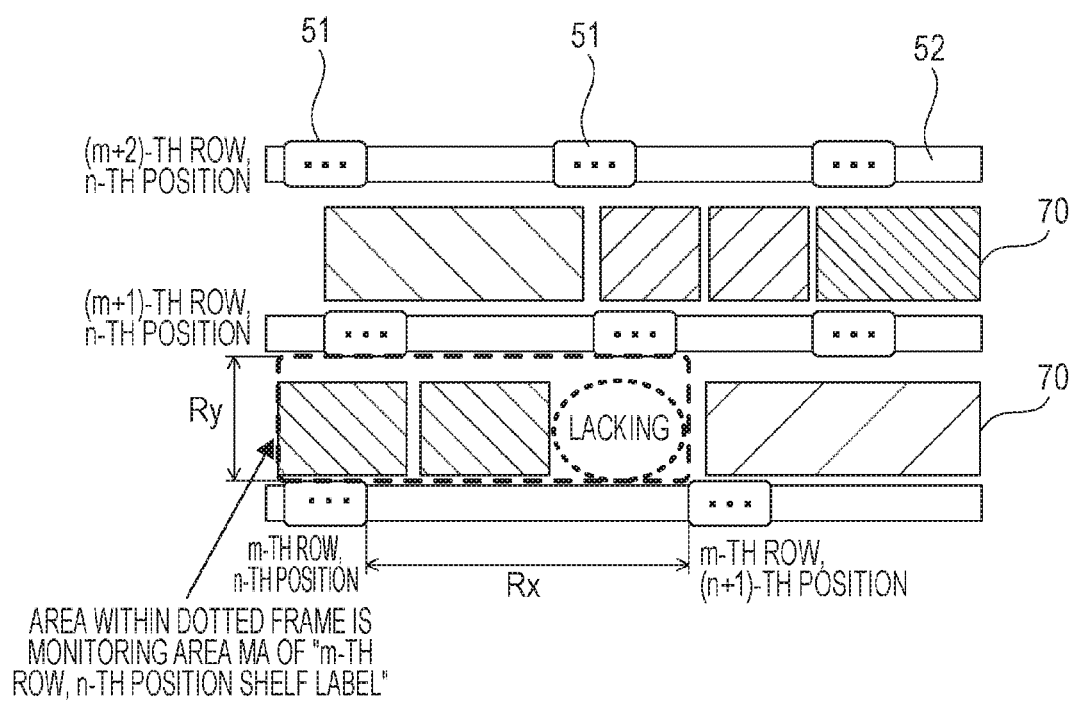
FIG. 8 illustrates an example in which a monitoring area is set by the stock monitoring device illustrated in FIGS. 1 and 5.

In FIG. 8, for example, when m-th (=1) row, n-th (=1) position shelf label 51 is set as a reference shelf label, monitoring area setter 213 obtains the distance between reference shelf label 51 and adjacent shelf label 51.

For example, distance Rx between m-th row, n-th position reference shelf label 51 and m-th row, (n+1)-th position shelf label 51 on the right is detected, and distance Ry between reference shelf label 51 and (m+1)-th row, n-th position shelf label 51 thereabove is detected.

Monitoring area setter 212, for example, sets monitoring area MA (see the dotted frame) having a size and a shape determined by distances Rx and Rx as a monitoring area for first-row, first position shelf label 51. Regarding other shelf labels 51, monitoring area setter 212 detects distances Rx and Ry between adjacent shelf labels 51 so as to set monitoring areas MA for respective shelf labels 51 detected through video recognition.

In the above manner, for each shelf label 51 detected through video recognition, monitoring area setter 212 calculates a distance between shelf label 51 and an adjacent shelf label, and sets monitoring area MA corresponding to each shelf label 51 based on the calculated distance. Thus, it is possible to accurately set monitoring area MA for product 70 to be displayed corresponding to shelf label 51.

The shape of monitoring area MA may be rectangular or circular including elliptic. In addition, shelf label 51 may be arranged in accordance with a predetermined rule (or criteria) for each space where product 70 is to be displayed. For example, shelf label 51 may be arranged in accordance with such a certain rule that shelf label 51 is arranged at the lower left of product 70. When the rule is defined, based on the position of each shelf label 51 or the distance between shelf labels 51 and the rule, it is possible to set monitoring area MA accurately. For example, when shelf label 51 is arranged at the lower left of product 70, the monitoring area would be present on the right of shelf label 51.

In addition, when there is a shelf row in which no shelf label 51 is arranged (e.g., the top shelf row), by arranging dummy shelf label 51, the distance between shelf labels 51 including dummy shelf label 51 may be determined. When obtaining distance Ry above the top shelf row by using dummy shelf label 51, for example, dummy shelf row 51 may be arranged on "POP" arranged for the shelf.

"POP" is an advertising medium, such as paper on which a product name, product price, advertising slogan, explanation, and/or illustration is written. Alternatively, for distance Ry for a shelf row in which no shelf label 51 is arranged, the distance between shelf labels 51 may be obtained based on the distance from another shelf row (e.g., a lower shelf row).

For example, for shelf label 51 with no adjacent shelf label 51, distance Ry calculated for another shelf label 51 may be reused. For example, Ry for an immediately below shelf row with little distorted perspective may be reused, or Ry may be estimated by converting Ry for another shelf row by taking camera parameters into account. Alternatively, for a shelf row with no shelf label 51, the distance between shelf labels 51 may be manually set.

In addition, for shelf label 51 located at the right end of a shelf row, when another adjacent display shelf 50 is present, the distance from shelf label 51 attached to the display shelf 50 may be determined as the distance between shelf labels 51. Alternatively, for shelf label 51 located at the right end of a shelf row, the distance from an image end of camera video may be set as the distance between shelf labels 51.

Shelf allocation information 400 may include, for example, information on one or more of the width, height, depth, and display number of product 70, which is a monitoring target. In this case, based on this information, detected shelf label corrector 216 may correct the shelf label position detected by shelf label detector 211 (S12a in FIG. 6).

In other words, shelf allocation information 400 may be used for checking the accuracy and/or correcting a detection result of shelf label 51 with video recognition. With correction of the shelf label position, it is possible to increase the accuracy for detecting of lacking of product 70, which is a monitoring target. Examples for correcting the shelf label position will be described later with reference to FIGS. 17 to 19.

After the setting of monitoring area MA, stock monitoring device 20, by using lacking detector 213, for example, detects a region where product 70 is short or lacking in monitoring area MA by pattern matching between camera video and background image of individual monitoring area MA (S14 in FIG. 6).

For example, in FIG. 8, two products 70 are displayed in a space where three products 70 can be displayed for m-th row, n-th column shelf label 51. Thus, background image corresponding to single product 70 appears in camera video of monitoring area MA.

When the background image appearing in monitoring area MA corresponds with the template image by pattern matching, lacking detector 213 detects that product 70 is not displayed in a region where the background image appears. In other words, shortage or lacking of product 70 corresponding to shelf label 51 is detected.

In response to detection of shortage or lacking of product 70, stock monitoring device 20, by using output section 214 for example, generates and outputs information as a notification of detecting of lacking of product 70 (S15 in FIG. 6). The information as a notification of detecting of lacking of product 70 may include text information and/or sound information or may include, for example, information for displaying a region regarding detecting of lacking in an emphasized manner on a display displaying the camera video.

Non-limiting examples of display in an emphasized manner include the following. The following display in an emphasized manner may be combined appropriately.

- In camera video, the color of the region regarding detecting of lacking (hereinafter also collectively referred to as "lack area" for convenience) is changed to more outstanding color (emphasized color) than the color of the other regions.
- The lack area is blinked.
- The lack area is displayed in a solid frame or a dotted frame. Color (emphasized color) may be used for the solid frame or dotted frame.
- The solid frame or dotted frame for the lack area is blinked.

As described above, according to stock monitoring device 20, based on the position of shelf label 51 detected with video recognition of camera video including display shelf 50, the monitoring area for display shelf 50 in the camera video is set. Thus, it is possible to appropriately set the monitoring area to the camera video including display shelf 50 without a manual operation.

When a reference shelf label is manually designated, it may be unavailable to completely remove a manual operation for setting the monitoring area; however, the setting of monitoring area can be almost automated, and also, an accurate reference shelf label can be set. This enables setting of the monitoring area more accurately and more quickly than in the related art.

In other words, a display space of a monitoring target in display shelf 50 can be automatically set. Accordingly, for example, even when a relative position relationship between display shelf 50 and camera 10 varies due to an external cause such as vibrations, detection of shelf label 51 with video recognition enables reconfiguring of an appropriate monitoring area.

In addition, based on a change in video in response to the presence or absence of product 70 in the set monitoring area, stock monitoring device 20 monitors a stock of product 70 in display shelf 50 and notifies, for example, a stock manager of the monitoring result. Thus, it is possible to prevent a specific product from remaining lacking. Accordingly, it is possible to prevent a product selling opportunity from being lost, and thus, to provide customers with a positive image.

Shelf Label Associating Process

Between the detection of lacking (S14) and the output of information (S15), as illustrated by a dotted line in FIG. 6, shelf label associating section 215 may perform a shelf label associating process (S14*a*).

Figure 9:
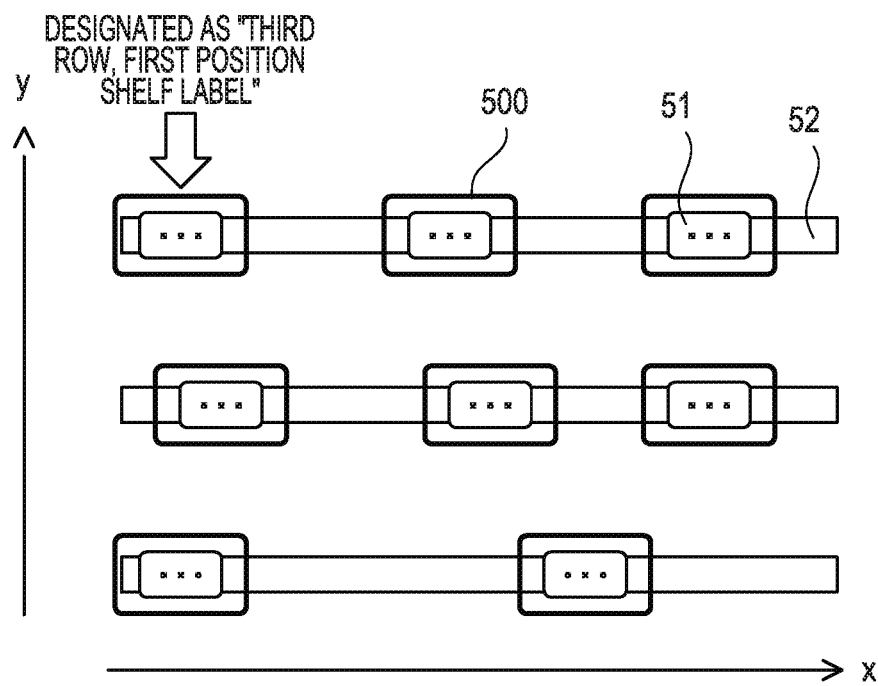
FIG. 9 illustrates an example of a flow of a shelf label associating process performed by the stock monitoring device illustrated in FIGS. 1 and 5.

The shelf label associating process illustrated as S14*a* in FIG. 6 may be performed as follows, for example. First, as illustrated in FIG. 9 for example, shelf label associating section 215 sets, as a reference shelf label, one (e.g., "third-row, first position" at the upper left) of shelf labels 51 detected through video recognition.

Figure 10:
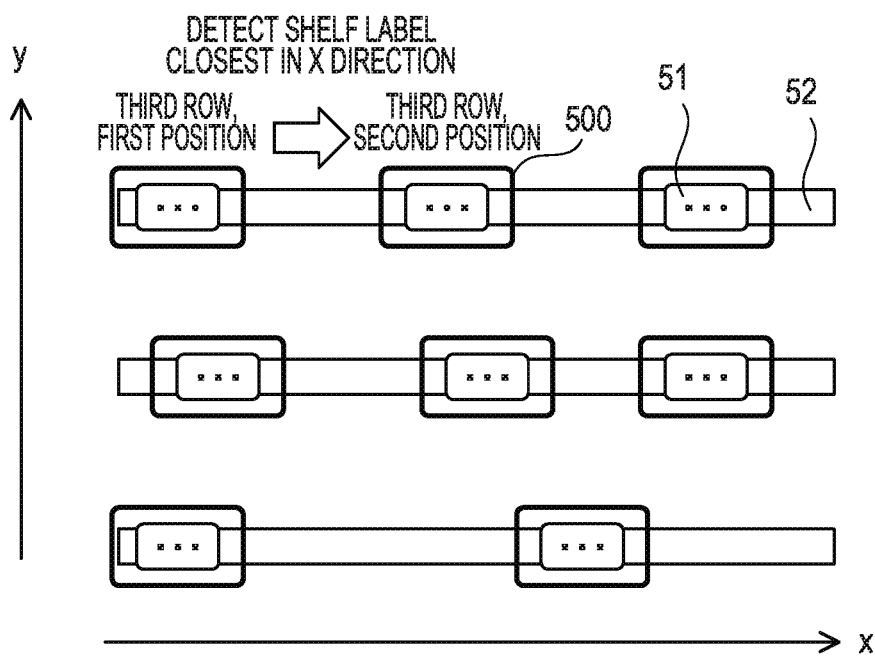
FIG. 10 illustrates an example of a flow of a shelf label associating process performed by the stock monitoring device illustrated in FIGS. 1 and 5.

Then, based on shelf allocation information 400, as illustrated in FIG. 10 for example, shelf label associating section 215 detects, for reference shelf label 51, shelf label 51 "having the closest x-coordinate among shelf labels 51 having close y-coordinates" as adjacent shelf label 51. In the example in FIG. 10, "third-row, second position" shelf label 51 is detected.

Shelf label associating section 215 repeats the process for detecting adjacent shelf label 51 illustrated in FIG. 10 until shelf label 51 located at the end of the shelf row to which reference shelf label 51 belongs, for example, "third-row, third position" shelf label 51, is detected.

When shelf label 51 located at the end of the shelf row to which reference shelf label 51 belongs is detected, shelf label associating section 215 detects, for shelf label 51 located at the end of the shelf row to which reference shelf label 51 belongs, shelf label 51 "having the closest y-coordinate". For example, as illustrated in FIG. 11, "second-row, third position" shelf label 51 is detected.

Figure 12:
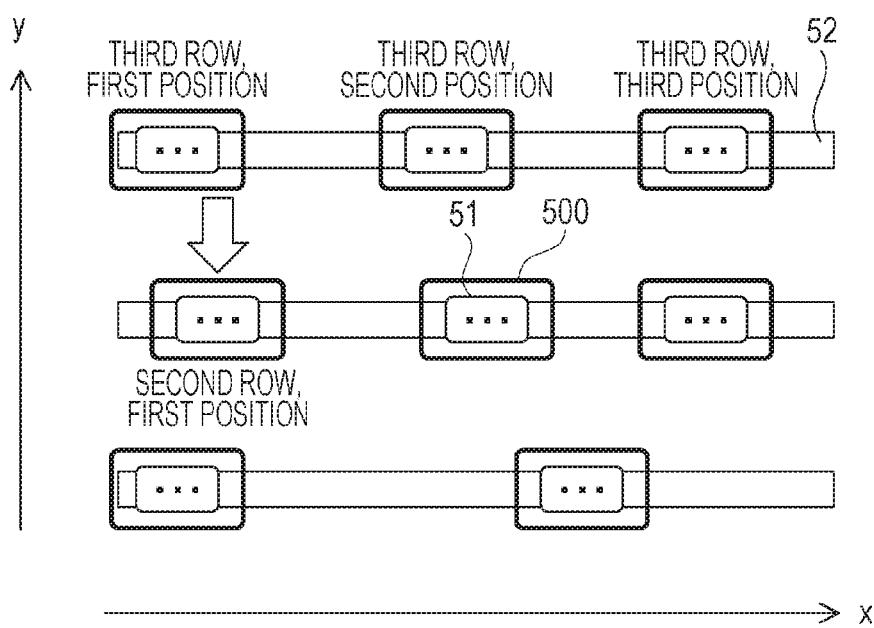
FIG. 12 illustrates an example of a flow of a shelf label associating process performed by the stock monitoring device illustrated in FIGS. 1 and 5.

When shelf label 51 located at the end of the shelf row to which reference shelf label 51 belongs is detected, as illustrated in FIG. 12, shelf label associating section 215 may set the search criterion to reference shelf label 51 again and may detect shelf label 51 "having the closest y-coordinate". In this case, "second-row, first position" shelf label 51 is detected.

Figure 11:
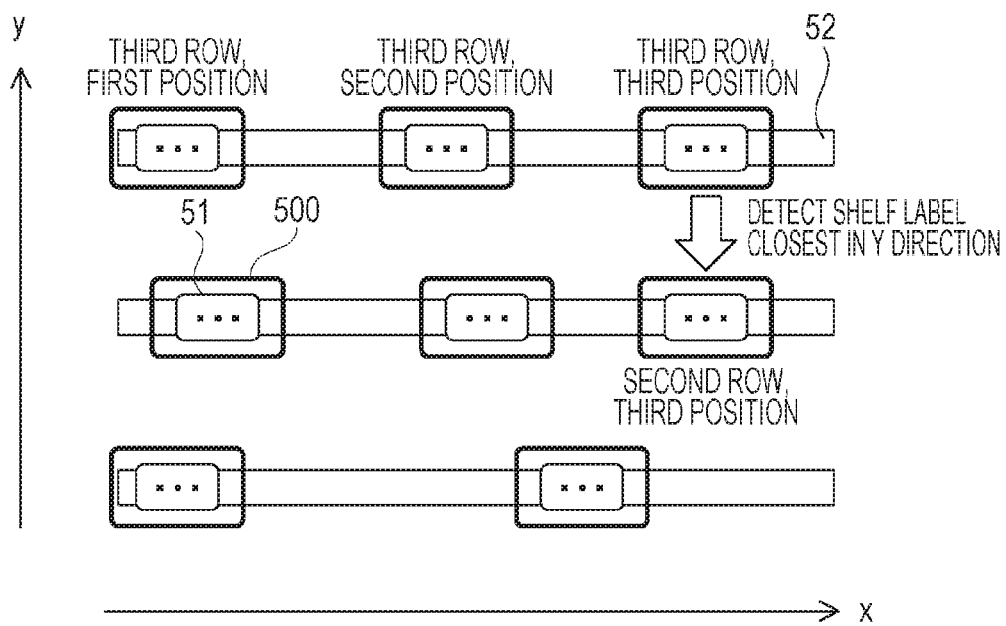
FIG. 11 illustrates an example of a flow of a shelf label associating process performed by the stock monitoring device illustrated in FIGS. 1 and 5.
Figure 15A:
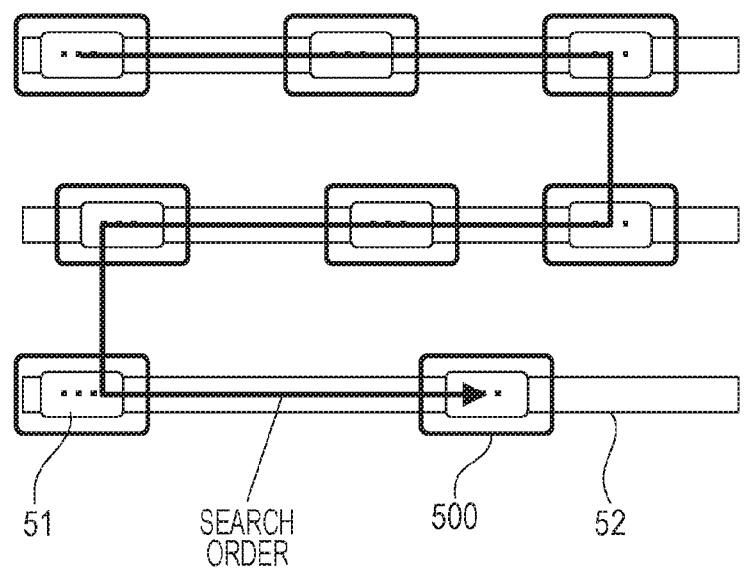
FIG. 15A illustrates an example of a search order in the shelf label detection process performed by the stock monitoring device illustrated in FIGS. 1 and 5.
Figure 15B:
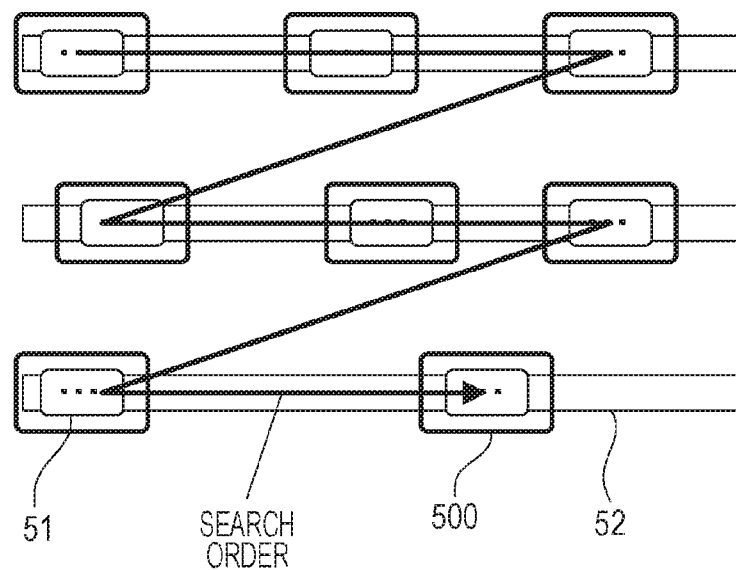
FIG. 15B illustrates an example of a search order in the shelf label detection process performed by the stock monitoring device illustrated in FIGS. 1 and 5.

Shelf label associating section 215 repeats the shelf label detection process illustrated in FIGS. 10 and 11 or FIGS. 10 and 12 until all shelf labels 51 are detected. FIG. 15A illustrates an example of a search order in the shelf label detection process illustrated in FIGS. 10 and 11, and FIG. 15B illustrates an example of a search order in the shelf label detection process illustrated in FIGS. 10 and 12. The order for searching for shelf label 51 is not limited to the orders illustrated in FIGS. 15A and 15B.

Figure 13:
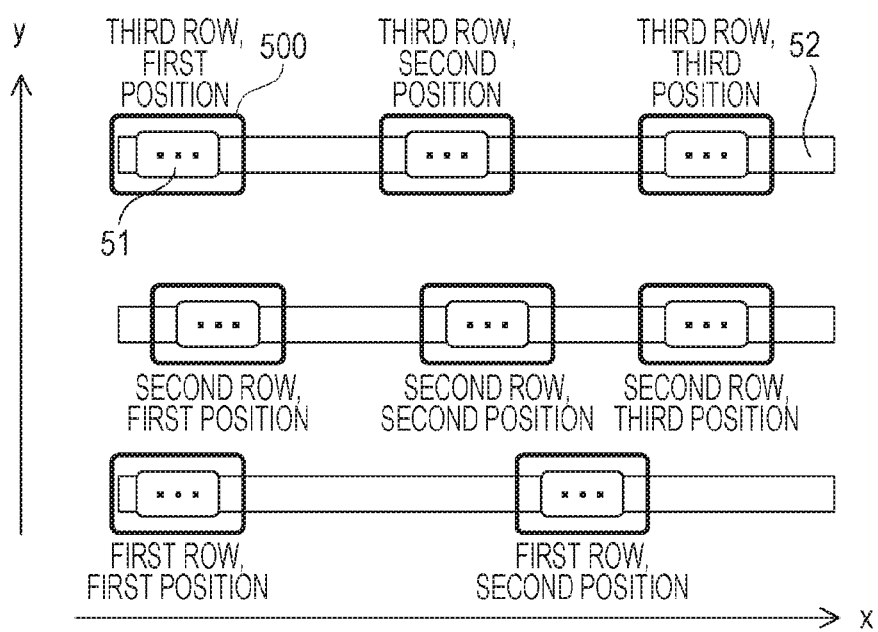
FIG. 13 illustrates an example of a flow of a shelf label associating process performed by the stock monitoring device illustrated in FIGS. 1 and 5.

When detection of all shelf labels 51 is completed, shelf label associating section 215 associates "m-th row, n-th position" shelf label 51 (see FIG. 13) with shelf allocation information 400 (e.g., product information).

With the shelf label associating process, each shelf label 51 detected by using video recognition is associated with shelf allocation information 400 including the product information. Thus, even when monitoring area MA is set based on the distance between shelf labels 51 (see FIG. 14), as described above, it is possible to determine the product information of a monitoring target in each monitoring area MA. The height of monitoring area MA in the top row may be set based on, for example, the height of a lower shelf row.

Setting of reference shelf label 51 may be stored in storage 205, for example. In and after a second-time shelf label associating process, the stored setting of reference shelf label 51 may be used. Thus, the reconfiguration of reference shelf label 51 may be unneeded.

In addition, shelf label associating section 215 may associate, for example, either or both of information indicating a lack area detected by lacking detector 213 and information of shelf label 51 detected through video recognition with shelf allocation information 400.

Generation of Notification Information Based on Shelf Allocation Information In S15 in FIG. 6, output section 214 may generate notification information based on shelf allocation information 400. For example, based on the association information between the information indicating a lack area and the information of detected shelf label 51, output section 214 may generate notification information including a location (lack area) regarding detecting of lacking of product 70 and/or a product name and/or a product code of product 70 detected as lacking. The generated notification information is, for example, output to output device 203 and/or communicator 206.

In this manner, by using shelf allocation information 400, stock monitoring device 20 is available to notify, for example, a stock manager of information on detecting of lacking including the product name and/or product code of individual product 70.

Thus, even when it is difficult to determine individual product name or the like by video analysis of camera video, for example, the stock manager is possible to accurately recognize which product 70 on which shelf row is under lacking. Accordingly, the stock manager is available to, for example, refill product 70 in individual shelf row accurately and smoothly.

Example of Setting Monitoring Area Using Shelf Allocation Information

Next, an example of setting monitoring area MA will be described. In this example, when shelf allocation information 400 includes, for example, information indicating the size of product 70 and information indicating the display number of product 70, monitoring area MA is set by using such information.

Figure 16:
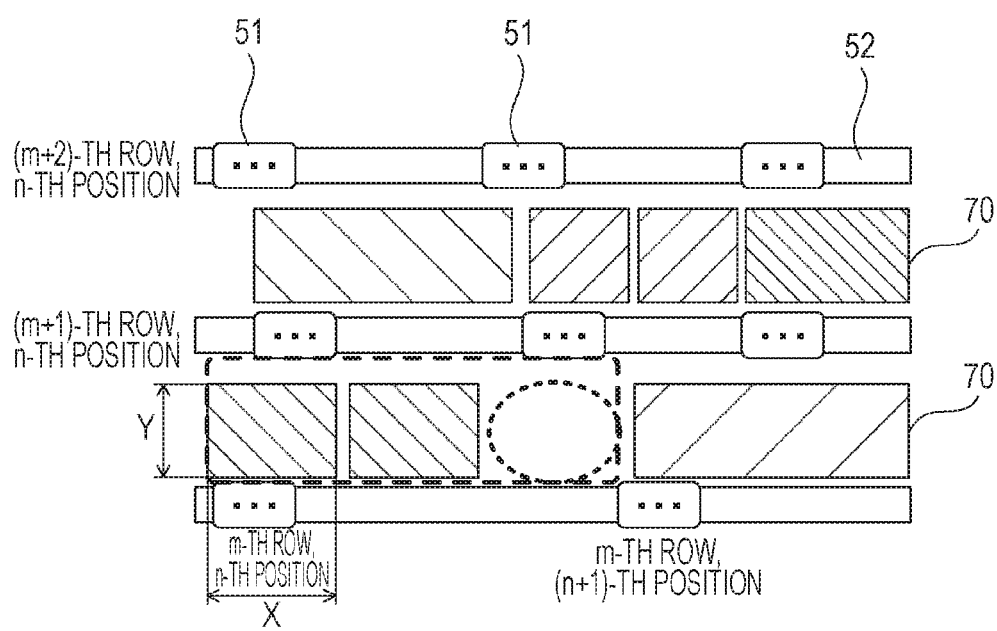
FIG. 16 illustrates an example in which a monitoring area is set by the stock monitoring device illustrated in FIGS. 1 and 5 by using the shelf allocation information.

For example, shelf allocation information 400 includes information indicating "three products 70 having a width X and a height Y are displayed for m-th row, n-th position shelf label 51". In this case, as illustrated in FIG. 16, monitoring area setter 212 may set monitoring area MA having such a size (width X and height Y) that includes three products 70. Product 70 may have any size in the depth direction in the example in FIG. 16.

As a result, monitoring area MA set in FIG. 16 and the monitoring area set in FIG. 8 have the same size. However, in the example in FIG. 16, when product 70 has a different size and/or a different display number, the size of monitoring area MA to be set would be different from that in the example in FIG. 8.

For example, when the size of product 70 in the example in FIG. 16 is smaller than that in the example in FIG. 8, or when the number of displayed products 70 in the example in FIG. 16 is smaller than that in the example in FIG. 8, the size of monitoring area MA to be set in the example in FIG. 16 would be smaller than that in the example in FIG. 8.

All information elements of the width, height, and display number of product 70 is not necessary to set monitoring area MA. As described above, the distance between shelf labels 51 is detected with video recognition to set monitoring area MA. Thus, from the detected distance, monitoring area setter 202 is possible to compensate for a part of information elements of the width, height, and display number of product 70, even when any one of the information elements is missing. In addition, the width and/or height of product 70 may be compensated for based on the size of shelf label 51 detected with video recognition. The size of shelf label 51 may be a known size or may be detected with video recognition of shelf label 51.

Further, as in the top shelf row of the display shelf, even when shelf label 51 as a reference to obtain the distance between shelf labels 51 in the y-axis direction is not available, monitoring area setter 212 is possible to appropriately set the size of monitoring area MA in the y-axis direction based on information indicating the height of product 70.

In addition, since the number of products 70, which are monitoring targets in monitoring area MA, can be known, for example, lacking detector 213 can more accurately perform stepwise detecting of lacking. Examples of the stepwise detecting of lacking will be described later.

Example of Correcting Shelf Label Detection Result Using Shelf Allocation Information Next, an example of correcting a shelf label detection result by using shelf allocation information 400 when shelf allocation information 400 includes, for example, information indicating the type of product 70 and information indicating the display number of product 70 will be described.

For example, when shelf allocation information 400 includes information indicating "three types of products 70 having different widths (X) are displayed on shelf board 52 in the (m+1)-th row", based on this information, detected shelf label corrector 216 (see FIG. 5) can detect and correct failure in detecting shelf label 51 through video recognition.

Figure 17:
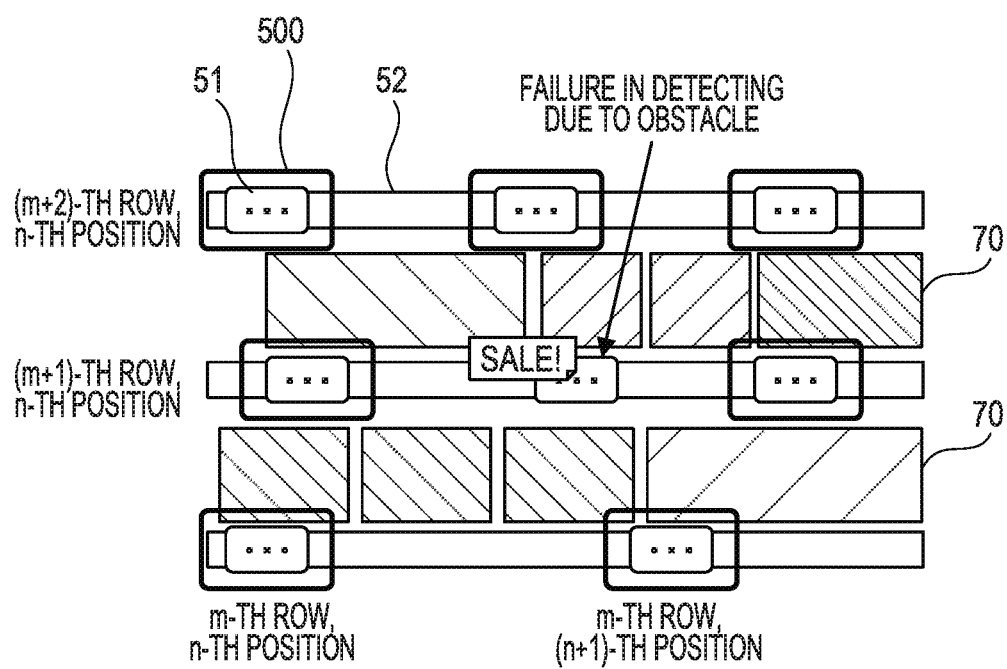
FIG. 17 illustrates an example in which a shelf label detection result obtained by the stock monitoring device illustrated in FIGS. 1 and 5 is corrected.
Figure 18:
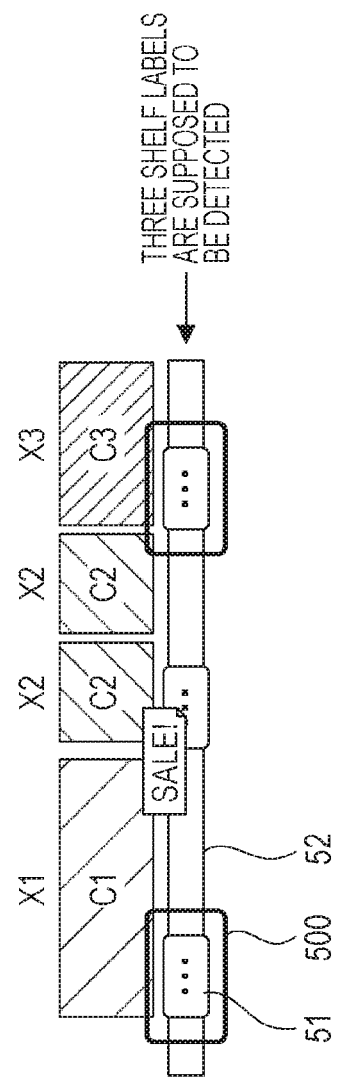
FIG. 18 illustrates the example in which the shelf label detection result obtained by the stock monitoring device illustrated in FIGS. 1 and 5 is corrected.

FIG. 17 illustrates a case where failure in detecting shelf label 51 may occur. In the example in FIG. 17, for shelf board 52 in the (m+1)-th (=second) row, three shelf labels 51 are supposed to be detected. Shelf allocation information 400 includes information indicating that, for three shelf labels 51, respectively, products 70 represented as C1, C2, and C3 in FIG. 18 and having different widths (X1, X2, and X3) are displayed.

However, for example, another label (obstacle) "SALE!" partly overlaps with second-row, second-position shelf label 51. Thus, second-row, second-position shelf label 51 may be failed in the detection with video recognition.

Figure 19:
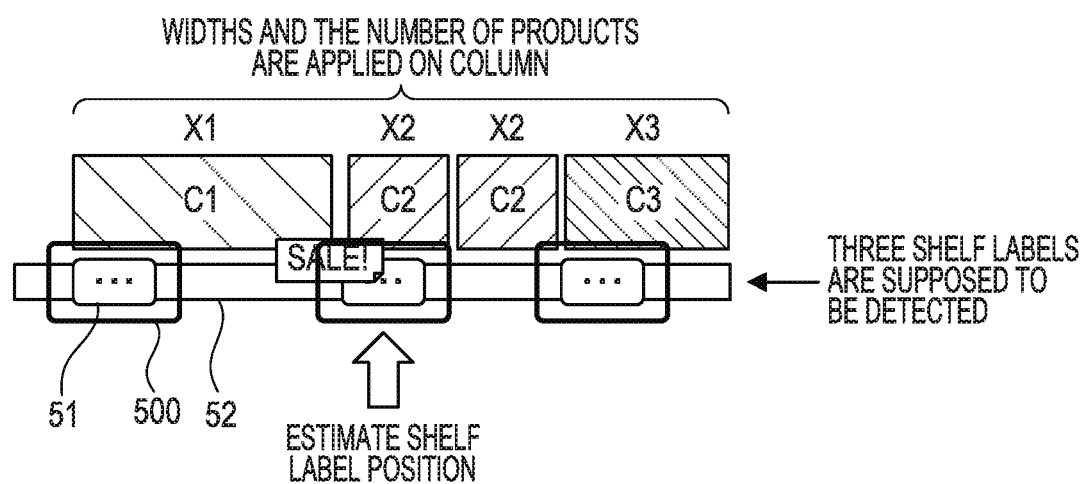
FIG. 19 illustrates the example in which the shelf label detection result obtained by the stock monitoring device illustrated in FIGS. 1 and 5 is corrected.

When the detection is failed, as illustrated in FIG. 19 for example, detected shelf label corrector 216 applies the widths (X1, X2, and X3) and display numbers of products 70 to shelf board 52 in the (m+1)-th (=second) row, thereby being available to estimate the presence of shelf label 51 at the second row, second position. Detected shelf label corrector 216 may add estimated shelf label 51 into shelf labels 51 detected by video recognition to correct the failure in detection.

In this manner, for example, even when there is shelf label 51 failed in detection by video recognition due to an obstacle, it is possible to correct the failure in detection by image recognition based on shelf allocation information 400. Thus, it is also possible to set monitoring area MA with higher accuracy based on the position of shelf label 51.

Application of PTZ Camera

By applying, for example, a PTZ camera as camera 10, and performing control for changing the imaging direction of PTZ camera 10, it is possible to capture multiple display shelves 50 or a plurality of difference display spaces of single display shelf 50 in the monitoring target.

Figure 20:
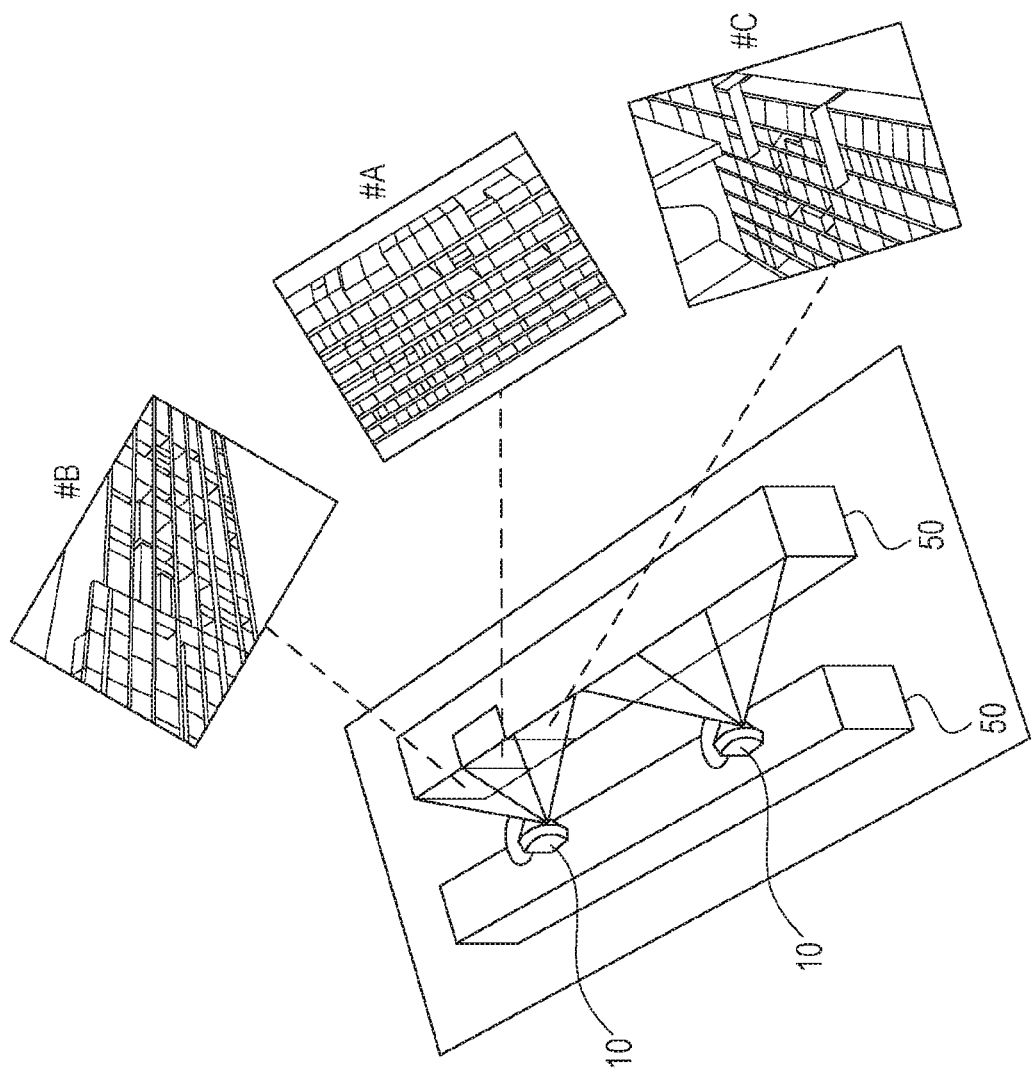
FIG. 20 illustrates an example of applying a PTZ (pan, tilt, and zoom) camera as a camera illustrated in FIG. 1.

FIG. 20 illustrates an example of applying PTZ camera 10. In the example illustrated in FIG. 20, two PTZ cameras 10 are arranged on, for example, a top of one of two display shelves 50 adjacent to each other in the depth direction.

Thus, each PTZ camera 10 images, for example, the front of the other of the two display shelves 50 from obliquely above. PTZ camera 10, for example, may also be arranged on the ceiling of a store where display shelves 50 are arranged and may image the front of display shelves 50 from obliquely above.

The imaging direction of each PTZ camera 10 may be changed in a plurality of directions (e.g., N=three) in the width direction of display shelves 50. "N" is an integer greater than or equal to 2 denoting the number of imaging directions. Changing the imaging direction may be controlled by, for example, stock monitoring device 20 communicating with PTZ camera 10 via communication IF 261 (see FIG. 5).

Control for changing the imaging direction may be performed periodically in a preset cycle or aperiodically at a specific time. The imaging direction may also be changed in accordance with an instruction from a user. For example, when a time slot during which specific product 70 tends to be lacking is known in advance in a predetermined unit period, such as a day, a week, or a month, the imaging direction may be controlled such that the monitoring target captures at least product 70 that tends to be lacking during the time slot. A non-limiting example of the time slot during which specific product 70 tends to be lacking is a regular or irregular sales promotion time slot (sale time slot) of specific product 70.

Information indicating the imaging direction of PTZ camera 10 (e.g., angle information) may be associated with shelf allocation information 400 described above. For example, IDs may be assigned to PTZ camera 10 and N (N is an integer greater than or equal to 2) angle information items, and the IDs may be associated with the IDs in shelf allocation information 400 (see FIG. 4).

Such association of the IDs enables, for example, identification of display shelf 50, the shelf row, PTZ camera 10, and the imaging direction for monitoring. The IDs may be associated by, for example, shelf label associating section 215 (see FIG. 5).

In addition, as described above, the recognition model appropriate for video recognition changes depending on the imaging direction, and thus, the recognition model may be prepared in advance for each of different imaging directions.

The recognition model appropriate for video recognition may also change depending on whether, for example, a glass door is provided in the front of display shelf 50. Thus, for example, the recognition model appropriate for video recognition may be prepared in advance depending on the imaging direction and/or whether a glass door is provided.

FIG. 21 illustrates an example in which recognition models #1, #2, and #3 are set for three imaging directions #A, #B, and #C, respectively. Alternatively, for example, a plurality of recognition models may be switched so as to select a recognition model by which the number of shelf labels 51 to be detected most closely matches the shelf allocation information.

In the above manner, by using PTZ camera 10 as camera 10, it is possible to monitor and know about a stock at a plurality of locations with single PTZ camera 10. Thus, the total number of cameras to be arranged in stock management system 1 can be reduced. This can reduce the total cost of stock management system 1.

Stepwise Detecting of Lacking

Even when lack information is output after detection of a lack area of product 70, it may not be possible to refill product 70 in time.

Figure 22A:
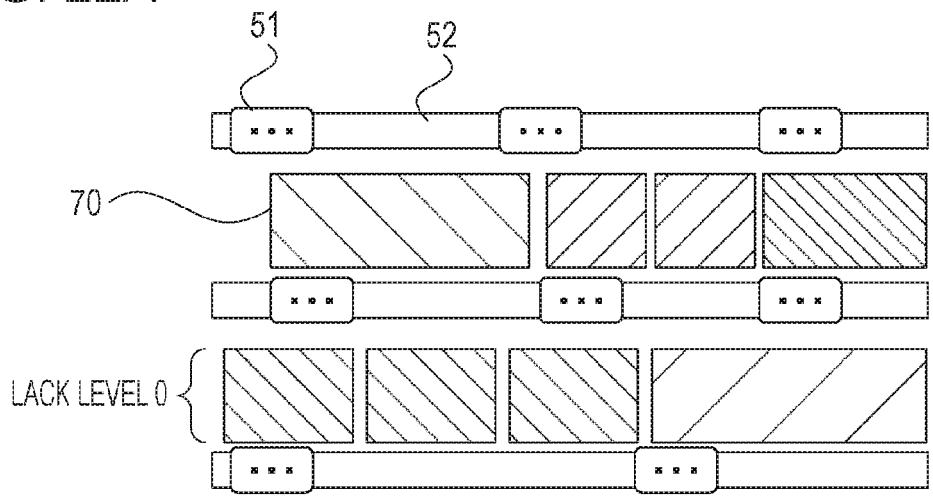
FIG. 22A illustrates an example in which stepwise stock levels are set by the stock monitoring device illustrated in FIGS. 1 and 5.
Figure 22B:
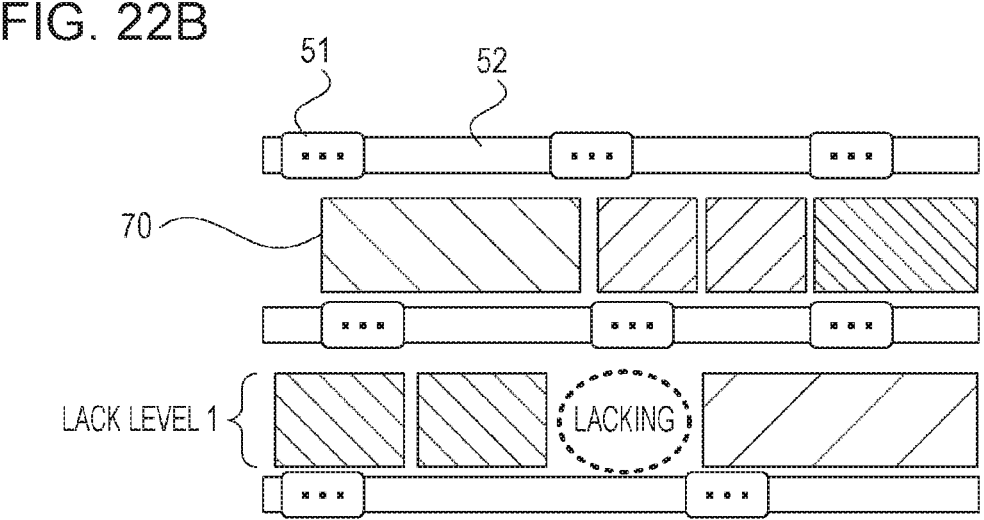
FIG. 22B illustrates an example in which stepwise stock levels are set by the stock monitoring device illustrated in FIGS. 1 and 5.
Figure 22C:
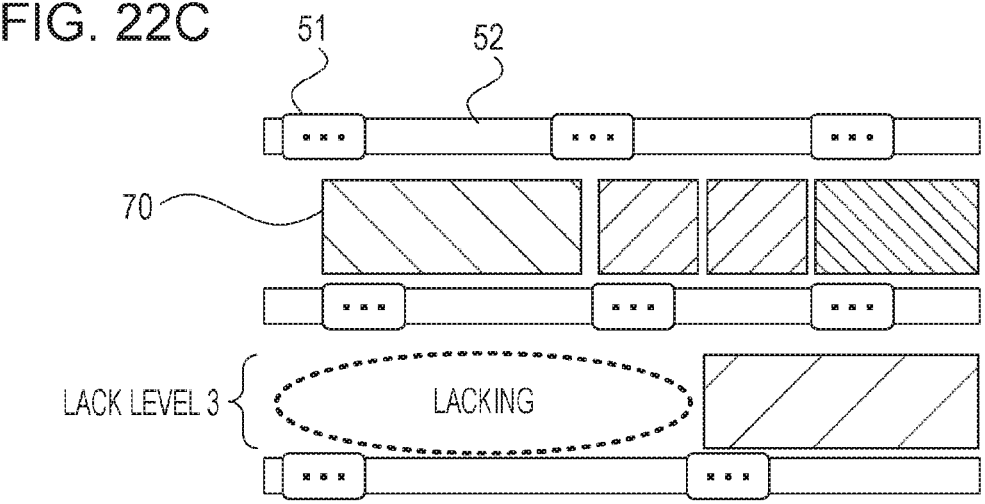
FIG. 22C illustrates an example in which stepwise stock levels are set by the stock monitoring device illustrated in FIGS. 1 and 5.

Thus, for example, in accordance with a ratio of the area of the background image appearing in the monitoring area set by monitoring area setter 212, stock monitoring device 20 may provide the stock manager with a stepwise stock level (i.e., "lack level") of product 70. FIGS. 22A to 22C illustrate examples of stepwise lack levels.

FIG. 22A illustrates a condition (lack level 0) where three products 70 are displayed at positions from "m-th row, n-th position" to "m-th row, (n+2)-th position". FIG. 22B illustrates a condition (lack level 1) where one of three products 70 is lacking, and FIG. 22C illustrates a condition (lack level 3) where three products 70 are lacking.

Stock monitoring device 20 (e.g., lacking detector 213), for example, sets the lack level and the ratio of the area of the background image appearing in the monitoring area at the lack level in association with each other so as to determine the lack level relative to the ratio of the area of the background image appearing in the monitoring area. Information indicating the determined lack level is output to, for example, output section 214.

Output section 214 generates notification information indicating the information indicating the lack level and outputs the notification information to output device 203 and/or communicator 206. Thus, the information indicating the stepwise lack level is presented to, for example, the stock manager.

Among the stepwise lack levels, the lack level at which the notification is to be sent (i.e., notification threshold level) may be set to a predetermined level or may be set adaptively by, for example, the stock manager. In the examples in FIGS. 22A to 22C, for example, "lack level 1" may be set as the notification threshold level. The notification may be provided for all lack levels.

In the above manner, when multiple products 70 are displayed in the monitoring area, stock monitoring device 20 is available to provide the stock manager with the stepwise lack level. Thus, at a stage before products 70 are completely lacking, the stock manager is available to be notified and to refill the product at an appropriate time.

Figure 24:
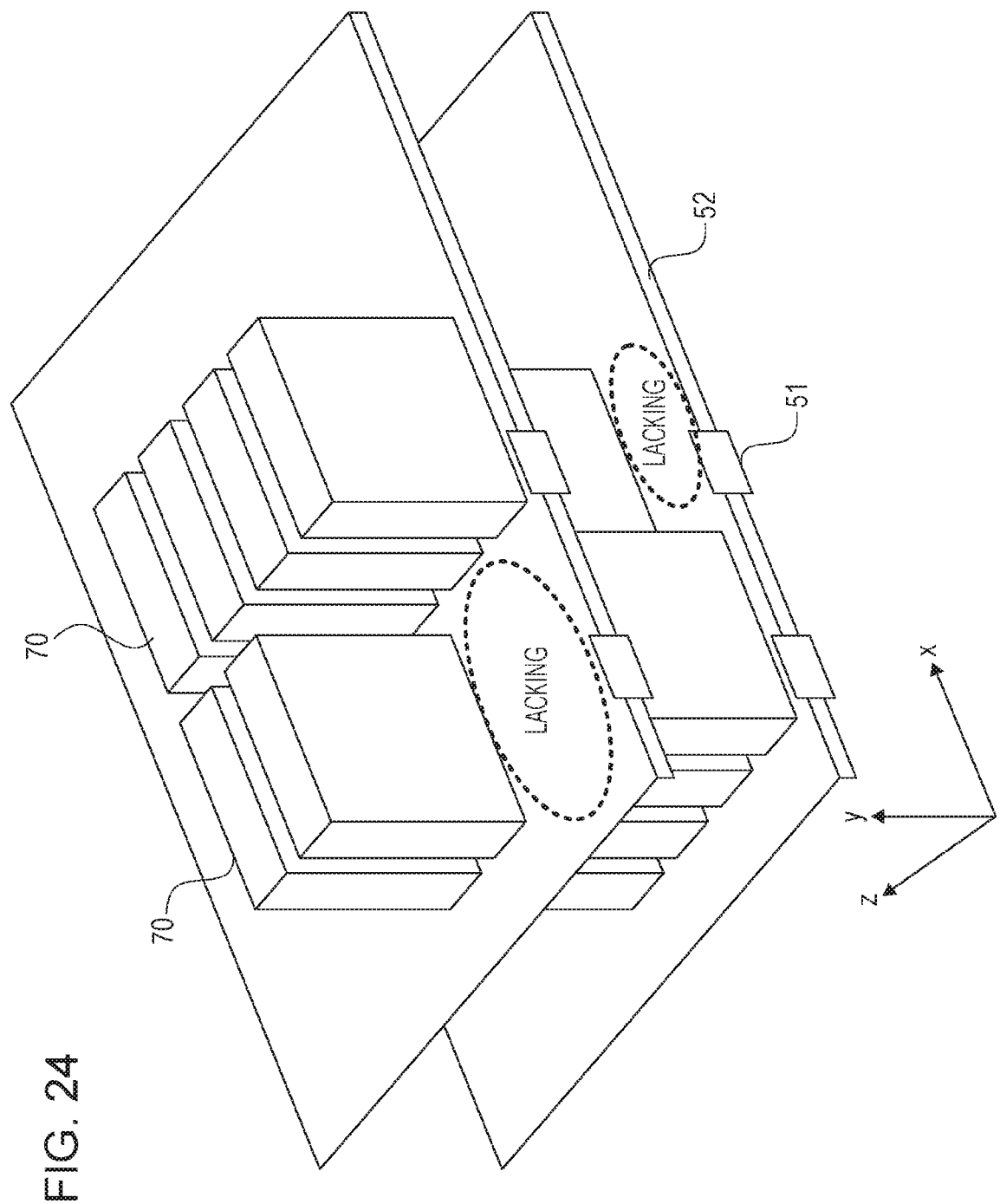
FIG. 24 illustrates an example in which stock levels are detected in the depth direction of shelf rows in the stock monitoring device illustrated in FIGS. 1 and 5.

When camera 10 is arranged at a position to image the shelf row from obliquely above, stock monitoring device 20, as illustrated in FIGS. 23 and 24 for example, may provide the stock manager with the lack level in the depth direction (z-axis direction) of the shelf row. For example, it is possible to provide that frontmost products 70 are lacking.

When shelf allocation information 400 includes information indicating the display number of product 70 in the depth direction from the front of the shelf row, based on a video recognition result of the monitoring area and shelf allocation information 400, the lack level in the depth direction of the shelf row may be set by, for example, lacking detector 213.

Mobile Object Removing Process

Figure 25A:
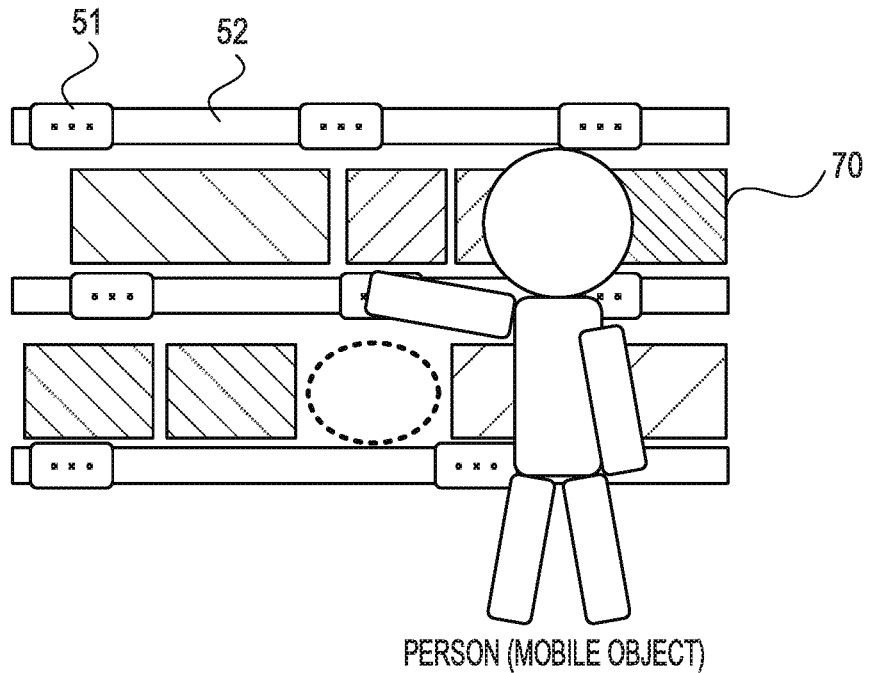
FIG. 25A illustrates an example of a mobile object removing process performed by the stock monitoring device illustrated in FIGS. 1 and 5.

A person (e.g., a customer) may pass through or may temporarily stop at the front of display shelf 50. In such a case, as illustrated in FIG. 25A for example, part or all of shelf label 51 may be hidden by the person in camera video.

In such a case, the person in the camera video becomes a temporal obstacle for shelf label detection and detecting of lacking through video recognition. The presence of the temporal obstacle may decrease the accuracy of shelf label detection and detecting of lacking.

Figure 25B:
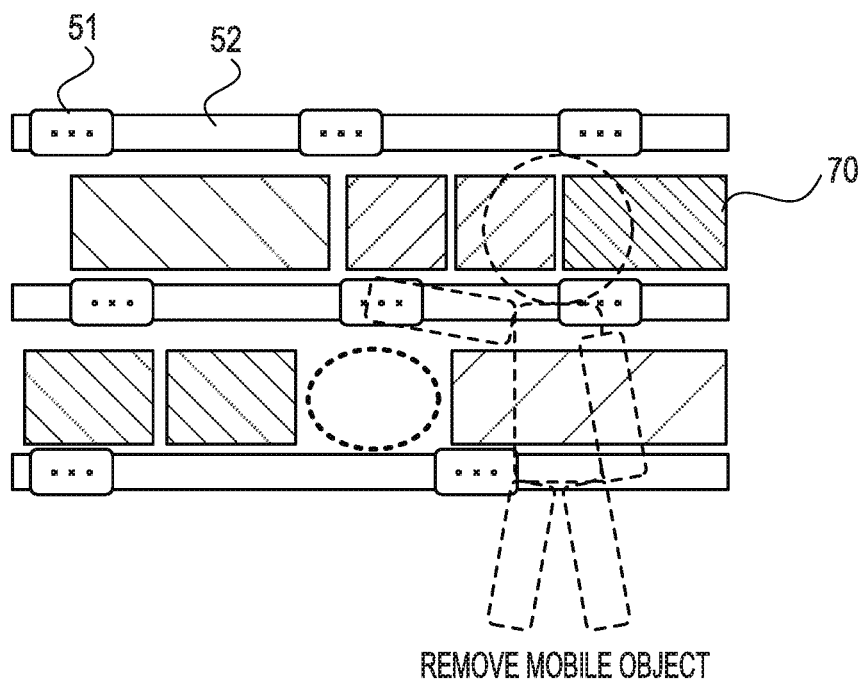
FIG. 25B illustrates the example of the mobile object removing process performed by the stock monitoring device illustrated in FIGS. 1 and 5.

Thus, as an example of a pre-processing of video recognition, as illustrated in FIG. 25B, stock monitoring device 20 (e.g., shelf label detector 211 and/or lacking detector 213) may remove a mobile object such as a person from the camera video.

When camera 10 supports a mobile object removing mode, for example, stock monitoring device 20 may communicate with camera 10 via communication IF 261 (see FIG. 5) to turn on the mobile object removing mode. A specific procedure for removing the mobile object is omitted from description because the aforementioned PTL 2 or the like is known.

Camera video of a few frames including the mobile object is subjected to the mobile object removing process, and thus, the accuracy of shelf label detection and detecting of lacking through video recognition can be increased.

Effects of Embodiment

As described above, according to the above-described embodiment, based on the position of shelf label 51 detected through video recognition of camera video including display shelf 50, the monitoring area is set for display shelf 50 in the camera video, for example, without depending on a manual operation, the monitoring area can be appropriately set for camera video including display shelf 50.

In other words, it is possible to set a display space as a monitoring target in display shelf 50 automatically. Accordingly, for example, even when a relative position relationship between display shelf 50 and camera 10 varies due to an external cause such as vibrations, detection of shelf label 51 through video recognition enables resetting of an appropriate monitoring area. The effects of the above-described embodiment are not limited to completely automatic setting of the display spaces as a monitoring target. When a part of settings is performed manually, such as manually designating a reference shelf label, it is possible to increase the accuracy.

In addition, based on a change in video in response to the presence or absence of product 70 in the set monitoring area, stock monitoring device 20 monitors a stock of product 70 in display shelf 50 and notifies, for example, a stock manager of the monitoring result. Thus, it is possible to prevent a specific product from remaining lacking. This prevents a product selling opportunity from being lost, and as a result, customers may have a positive image.

In addition, by using shelf allocation information 400, stock monitoring device 20 is available to notify, for example, stock manager of the product information of individual product 70 regarding detecting of lacking. Thus, for example, the stock manager is possible to recognize the shelf row in which product 70 is lacking accurately. Even when it is difficult to determine individual product name or the like by video analysis of camera video, the stock manager is available to, for example, refill product 70 in individual shelf row accurately and smoothly.

In addition, for example, even when there is shelf label 51 that may fail to be detected through video recognition owing to an obstacle, stock monitoring device 20 is available to correct the failure in detection through image recognition based on shelf allocation information 400. Thus, it is possible to set monitoring area MA with higher accuracy based on the position of shelf label 51.

Furthermore, stock monitoring device 20 is available to, for example, determine a space or region occupied by multiple products 70 in a shelf row with higher accuracy based on shelf allocation information 400. Accordingly, it is possible to increase the accuracy for setting the monitoring area based on the position of a shelf label, and thus, it is also possible to increase the accuracy for detecting lacking of product 70.

In addition, by using, for example, a PTZ camera as camera 10, it is unnecessary to arrange camera 10 for each display shelf 50 or each different region or space of display shelf 50, and thus, it is possible to reduce the number of cameras 10 arranged in stock management system 1.

This embodiment has described a PTZ camera as an example of camera 10. However, it is also possible to use a camera without a zooming function when the camera is available to change the imaging direction. In addition, when there are restrictions on the arranging direction of display shelf 50, camera 10 does not need to have both a panning function and a tilting function.

For example, when display shelves 50 are available in substantially the horizontal direction, even camera 10 with the tilting function in a single direction is possible to capture multiple display shelves 50. In addition, camera 10 may be an omnidirectional camera.

When an omnidirectional camera is used as camera 10, an image obtained by imaging is an omnidirectional image including video of multiple display shelves 50 around camera 10. In this case, control for changing the imaging direction corresponds to a process for performing control for changing a portion to be extracted from the obtained omnidirectional image.

Stock monitoring device 20 performs shelf label detection and/or detecting of lacking by using a recognition model appropriate for each virtual imaging direction corresponding to the portion extracted from the omnidirectional image, thereby performing substantially the same control as that when using a PTZ camera.

The omnidirectional image is available to capture video of multiple display shelves 50. Thus, portions corresponding to respective display shelves 50 can be extracted at the same time, and recognition models appropriate for the respective portions can be used for shelf label detection and/or detecting of lacking. Thus, multiple display shelves 50 can be monitored at the same time.

In addition, by using, for example, the recognition model appropriate for video recognition depending on the imaging direction and/or whether a glass door is provided of display shelf 50, stock monitoring device 20 is possible to increase the accuracy for shelf label detection and/or lacking detection.

In addition, in a case where multiple products 70 are displayed in the monitoring area, stock monitoring device 20 is available to provide the stock manager with the stepwise lack level. Thus, at a stage before products 70 are completely lacking, stock monitoring device 20 is available to notify reminder information to the stock manager. Therefore, the stock manager can refill the product appropriately.

Furthermore, camera video of a few frames including the mobile object is subjected to the mobile object removing process, and thus, the accuracy of shelf label detection and detecting of lacking through video recognition can be increased in stock monitoring device 20.

Others

Although the above embodiment has described an example in which the monitoring target of computer 20 is product 70 displayed in display shelf 50, the monitoring target of computer 20 is not limited to product 70 for commercial transaction. For example, the monitoring target of computer 20 may be "article" such as an exhibit displayed in a showcase. In this case, for example, computer 20 is possible to detect missing of "article" from a showcase and notify a manager or the like.

Computer 20 that monitors a stock or display condition of "article" may be referred to as, for example, "shelf monitoring device", "article monitoring device", "article display condition monitoring device", or the like. In addition, a program causing computer 20 to function as a device that monitors a stock or display condition of "article" may be referred to as "shelf monitoring program", "article monitoring program", "article display condition monitoring program", or the like.

The functional blocks used in the above description of the embodiments are typically implemented as an LSI, which is an integrated circuit. Each of the functional blocks may be implemented as a single chip, or some or all of the functional blocks may be integrated into a single chip. Although the integrated circuit is herein called an LSI, the integrated circuit may be called an IC, a system LSI, a super LSI, or an ultra LSI depending on the difference in the degree of integration.

In addition, the technique for circuit integration is not limited to LSI, and circuit integration may be implemented by using a dedicated circuit or a general-purpose processor. An FPGA (Field Programmable Gate Array) that is programmable after manufacturing the LSI, or a reconfigurable processor for which connections and settings of circuit cells within the LSI can be reconfigured may be used.

Furthermore, in a case where a technique for circuit integration that replaces LSI emerges with the advancement of semiconductor technology or based on any technology that is separately derived, the functional blocks may be integrated by using the technique, as a matter of course. Application of, for example, biotechnology is possible.

Summarizing

A general aspect of a shelf monitoring device may include: a detector that detects a shelf label attached to a display shelf to correspond to an article displayed in the display shelf with video recognition of video data including the display shelf; a setter that sets, based on a position of the detected shelf label, a monitoring area in which the article is to be displayed in the display shelf in the video data; a monitoring section that monitors, based on a change in video in response to presence or absence of the article in the monitoring area, a display condition of the article in the display shelf; and an output section that outputs a monitoring result obtained by the monitoring section.

The shelf monitoring device may further include: a communicator that receives shelf allocation information including at least information on an article to be displayed in each monitoring area; and an associating section that associates the information on the article included in the shelf allocation information with the shelf label detected by the detector. When the monitoring result of the monitoring area indicates shortage or lacking of the article, the output section may output the monitoring result and the information on the article associated with the shelf label corresponding to the monitoring area.

The shelf monitoring device may further include: a communicator that receives shelf allocation information including at least one of a size and a number of articles to be displayed in each monitoring area; and a corrector that corrects, based on the at least one of the size and the number of articles included in the shelf allocation information, a position of the shelf label detected by the detector.

The shelf monitoring device may further include: a communicator that receives shelf allocation information including at least one of a size and a number of articles to be displayed in each monitoring area, and the setter may determine, based on the at least one of the size and the number of the articles included in the shelf allocation information, a size of the monitoring area.

In a general aspect of the shelf monitoring device, the video data may include a plurality of video data pieces captured in a plurality of different imaging directions by at least a camera whose imaging direction is variable. The detector may detect the shelf label through video recognition using a recognition model corresponding to the imaging direction.

In a general aspect of the shelf monitoring device, the monitoring section may detect a stock level of the article stepwise based on a ratio of an area of background image appearing in the monitoring area, and the output section may output information indicating the stock level at a stage before the article is lacking.

The shelf monitoring device may further include: a communicator that receives shelf allocation information including information of a number of articles to be displayed in each monitoring area, and the monitoring section may detect a stock level of the article stepwise based on a ratio of an area of background image appearing in the monitoring area and the number of articles included in the shelf allocation information.

In the shelf monitoring device, the setter may calculate, for each detected shelf label, a distance between shelf labels adjacent to each other and may set, based on the distance, a monitoring area corresponding to the shelf label.

In the shelf monitoring device, the shelf label may be arranged in accordance with a predetermined rule in each area in which the article is displayed, and, based on the distance between the shelf labels adjacent to each other and the predetermined rule, the setter may set a monitoring area.

In the shelf monitoring device, for a shelf label without the adjacent shelf label, based on a distance calculated for another shelf label, the setter may set a monitoring area corresponding to the shelf label without the adjacent shelf label.

One general aspect of a shelf monitoring method includes: detecting a shelf label attached to a display shelf to correspond to an article to be displayed in the display shelf with video recognition of video data including the display shelf; setting, based on a position of the detected shelf label, a monitoring area in which the article is to be displayed in the display shelf in the video data; monitoring, based on a change in video in response to presence or absence of the article in the monitoring area, a display condition of the article in the display shelf; and outputting a result of the monitoring.

One aspect of a shelf label detection program causes a computer to execute a process which includes: detecting a shelf label attached to a display shelf to correspond to an article to be displayed in the display shelf with video recognition of video data including the display shelf; setting, based on a position of the detected shelf label, a monitoring area in which the article is to be displayed in the display shelf in the video data; monitoring, based on a change in video in response to presence or absence of the article in the monitoring area, a display condition of the article in the display shelf; and outputting a result of the monitoring.

The disclosure of Japanese Patent Application No. 2017-209440, filed on Oct. 30, 2017, including the specification, drawings and abstract, is incorporated herein by reference in its entirety.

INDUSTRIAL APPLICABILITY

The present disclosure is suitable for a system that monitors or manages an article display condition.

REFERENCE SIGNS LIST

1 Stock management system
10 Camera
20 Computer (stock monitoring device)
50 Display shelf
51 Shelf label
52 Shelf board
70 Product
201 Processor
202 Input device
203 Output device
204 Memory
205 Storage
206 Communicator
211 Shelf label detector
212 Monitoring area setter
213 Lacking detector
214 Output section
215 Shelf label associating section
216 Detected shelf label corrector
261, 262 Communication interface (IF)
400 Shelf allocation information
MA Monitoring area

The invention claimed is:

1. A shelf monitoring device, comprising:
a detector that detects a display shelf from video data including the display shelf,
a setter that sets, in the video data, a plurality of monitoring areas in each of which a plurality of articles are to be displayed;
a processor that, for each of the plurality of monitoring areas,
analyzes the video data to determine a size of space occupied by a background image for a respective monitoring area, and
calculates a ratio of the size of the respective monitoring area occupied by the background image with respect to an entirety of the respective monitoring area;
a monitoring circuit that
estimates a stock level of the articles in each of the plurality of monitoring areas based on the calculated ratio, and monitors a stepwise stock level of the articles in each of the plurality of monitoring areas based on the estimated stock level, the stepwise stock level of the articles indicating a shortage of the articles; and
an output circuit that outputs information indicating the stock level of at least one of the monitoring areas before the monitoring area becomes completely lacking when the calculated ratio is determined to be higher than a reference threshold.

2. The shelf monitoring device according to claim 1, further comprising:

a communicator that receives shelf allocation information including at least information on an article to be displayed in each of the monitoring areas; and
an associating circuit that associates the information on the article included in the shelf allocation information with the display shelf detected by the detector,
wherein when a monitoring result of the monitoring areas indicates shortage or lacking of the article in the at least one of the monitoring areas, the output circuit outputs the information regarding the article associated with the display shelf corresponding to the at least one of the monitoring areas.

3. The shelf monitoring device according to claim 1, further comprising:
a communicator that receives shelf allocation information including at least one of a size and a number of articles to be displayed in each of the monitoring areas; and
a corrector that corrects, based on the at least one of the size and the number of articles to be displayed included in the shelf allocation information, a position of the display shelf detected by the detector.

4. The shelf monitoring device according to claim 1, further comprising:
a communicator that receives shelf allocation information including at least one of a size and a number of articles to be displayed in each of the monitoring areas, wherein
the setter determines, based on the at least one of the size and the number of articles to be displayed included in the shelf allocation information, a size of each of the monitoring areas.

5. The shelf monitoring device according to claim 1, wherein
the video data includes a plurality of video data pieces captured in a plurality of different imaging directions by at least a camera whose imaging direction is variable, and
the detector detects the display shelf with video recognition using a recognition model corresponding to the imaging direction.

6. The shelf monitoring device according to claim 1, further comprising:
a communicator that receives shelf allocation information including information of a number of articles to be displayed in each of the monitoring areas, wherein
the monitoring circuit detects the stock level of the articles stepwise further based on the number of articles included in the shelf allocation information.

7. The shelf monitoring device according to claim 1, wherein
the setter calculates, for each detected display shelf, a distance between display shelves adjacent to each other and sets, based on the distance, a monitoring area corresponding to a respective display shelf.

8. The shelf monitoring device according to claim 7, wherein
the display shelf is arranged in accordance with a predetermined rule in each space in which the article is displayed, and
based on each distance between the display shelves adjacent to each other and the predetermined rule, the setter sets the monitoring area.

9. The shelf monitoring device according to claim 7, wherein
for a display shelf without an adjacent display shelf, the setter sets, based on a distance calculated for another display shelf, a monitoring area corresponding to the display shelf without the adjacent display shelf.

10. The shelf monitoring device according to claim 1 wherein,
the detector detects a shelf label attached to the display shelf, and
the setter sets the plurality of monitoring areas based on a position of the detected shelf label.

11. A shelf monitoring method, comprising:
detecting, by a processor, a display shelf from video data including the display shelf;
setting, by the processor and in the video data, a plurality of monitoring areas in each of which a plurality of articles are to be displayed;
analyzing, by the processor, the video data to determine a size of space occupied by a background image for a respective monitoring area;
calculating, by the processor, a ratio of the size of the respective monitoring area occupied by the background image with respect to an entirety of the respective monitoring area;
estimating, by the processor, a stock level of the articles in each of the plurality of monitoring areas based on the calculated ratio;
monitoring, by the processor, a stepwise stock level of the articles in each of the plurality of monitoring areas based on the estimated stock level, the stepwise stock level of the articles indicating a shortage of the articles; and
outputting, by the processor, information indicating the stock level of at least one of the monitoring areas before the monitoring area becomes completely lacking when the calculated ratio is determined to be higher than a reference threshold.

12. A non-transitory computer readable storage medium housing a shelf monitoring program that causes a processor to execute a process comprising:
detecting a display shelf from video data including the display shelf;
setting, in the video data, a plurality of monitoring areas in each of which a plurality of articles are to be displayed;
analyzing the video data to determine a size of space occupied by a background image for a respective monitoring area;
calculating a ratio of the size of the respective monitoring area occupied by the background image with respect to an entirety of the respective monitoring area;
estimating a stock level of the articles in each of the plurality of monitoring areas based on the calculated ratio;
monitoring a stepwise stock level of the articles in each of the plurality of monitoring areas based on the estimated stock level, the stepwise stock level of the articles indicating a shortage of the articles; and
outputting information indicating the stock level of at least one of the monitoring areas before the monitoring area becomes completely lacking when the calculated ratio is determined to be higher than a reference threshold.

* * * * *